United States Patent
Harada et al.

(10) Patent No.: US 7,782,400 B2
(45) Date of Patent: Aug. 24, 2010

(54) IMAGE DISPLAY CONTROLLER AND IMAGE DISPLAY SYSTEM

(75) Inventors: Shigeo Harada, Tokyo (JP); Tatsuki Iwasaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 973 days.

(21) Appl. No.: 10/554,748

(22) PCT Filed: Dec. 18, 2003

(86) PCT No.: PCT/JP03/16248

§ 371 (c)(1),
(2), (4) Date: Oct. 28, 2005

(87) PCT Pub. No.: WO2005/062605

PCT Pub. Date: Jul. 7, 2005

(65) Prior Publication Data

US 2006/0288372 A1  Dec. 21, 2006

(51) Int. Cl.
*H04N 5/50* (2006.01)

(52) U.S. Cl. .................................................. 348/569

(58) Field of Classification Search ................ 348/569, 348/563–566, 553, 14.08, 706; 715/843, 715/763, 810; 725/56, 52, 39, 40, 45; 345/327, 345/326, 328, 841, 721

See application file for complete search history.

(56) References Cited

U.S. PATENT DOCUMENTS

| | | | |
|---|---|---|---|
| 5,410,326 A * | 4/1995 | Goldstein | 348/734 |
| 5,438,372 A * | 8/1995 | Tsumori et al. | 348/565 |
| 5,485,221 A * | 1/1996 | Banker et al. | 348/563 |
| 5,543,857 A * | 8/1996 | Wehmeyer et al. | 348/589 |
| 5,648,813 A * | 7/1997 | Tanigawa et al. | 725/139 |
| 6,118,442 A * | 9/2000 | Tanigawa | 715/719 |
| 6,462,784 B1 * | 10/2002 | Kohno et al. | 348/563 |
| 6,557,016 B2 * | 4/2003 | Tanigawa et al. | 715/246 |
| 6,842,653 B2 * | 1/2005 | Weishut et al. | 700/83 |
| 6,992,728 B2 * | 1/2006 | Takagi et al. | 348/569 |
| 7,061,545 B1 * | 6/2006 | Kweon et al. | 348/569 |
| 7,068,323 B2 * | 6/2006 | Lee et al. | 348/569 |
| 7,168,050 B1 * | 1/2007 | Kwon et al. | 715/843 |

(Continued)

FOREIGN PATENT DOCUMENTS

JP  05-075945 A  3/1993

(Continued)

*Primary Examiner*—Paulos M Natnael
(74) *Attorney, Agent, or Firm*—Birch, Stewart, Kolasch & Birch, LLP.

(57) ABSTRACT

An image display unit operational interface for easily selecting a lot of functions while checking the content of an underlying image is provided.

In an image display control device (3) for displaying on a display unit (5) a large menu having a plurality of menu items, and an underlying image, to allow performing menu item selection and operation according to instructions by a user, a controller (14) for, according to the instructions, selecting and controlling one of either of the large menu and a small menu that has as menu items a lone portion of the menu items in the large menu, and a menu image compositor (20) for, according to control by the controller, simultaneously displaying on the display unit the small menu together with the underlying image are included.

9 Claims, 18 Drawing Sheets

U.S. PATENT DOCUMENTS

| | | | |
|---|---|---|---|
| 7,362,381 B1 * | 4/2008 | Stahl et al. | 348/569 |
| 2003/0103165 A1 * | 6/2003 | Bullinger et al. | 348/569 |
| 2003/0174202 A1 * | 9/2003 | Eshkoli et al. | 348/14.08 |

FOREIGN PATENT DOCUMENTS

| | | |
|---|---|---|
| JP | 09-154077 A | 6/1997 |
| JP | 11-150691 A | 6/1999 |
| JP | 2000-270236 A | 9/2000 |
| JP | 2001-069369 A | 3/2001 |
| JP | 2001-268457 A | 9/2001 |
| JP | 2001-268465 A | 9/2001 |
| JP | 2001-312880 A | 11/2001 |
| JP | 2002-190992 A | 7/2002 |
| JP | 2002-374475 A | 12/2002 |
| JP | 2003-76463 A | 3/2003 |

* cited by examiner

IMAGE DISPLAY CONTROLLER AND IMAGE DISPLAY SYSTEM

TECHNICAL FIELD

The present invention relates to control devices for image display, and image display devices using the control device, and particularly to a technology for making it easy for a user to operate such devices.

BACKGROUND ART

Digital broadcasting services are expected to be major broadcasting services in the future. In the digital broadcasting services, compared-to-conventional analog broadcasting, services that are presented to users, such as interactive functions and multichannel broadcasting, are expected to become dramatically abundant. In addition, television receiving terminals, beginning with their integration with VCR or DVD systems, have increasingly become sophisticated every year.

Meanwhile, in order for a user to fully utilize such abundant services or sophisticated functions, TV receiving sets are desired to achieve operational interfaces by which the user can easily select desired functions.

As a method of a user's selecting desired functions from a lot of function menus appropriately (by fewer operational steps, and without requiring background information), as described in Japanese Patent Laid-Open No. 270236/2000, a method of selecting desired functions by displaying a GUI (graphical user interface) screen on a TV receiving set screen has been conceived.

However, regarding an image display device, situations in which the user has to carry out menu selection while checking the condition of the underlying image often occur. With conventional technologies in such cases, because the display area for the underlying image is used for displaying menus, the user cannot check the condition of the underlying image. Accordingly, it has been required to repeat operations in which the user selects a menu, checks the condition of the underlying image after the menu operation screen is erased, and if it is not a desired result, the user displays the menu screen again to select the menu, and then again checks the underlying screen. The present invention aims to resolve such problems.

DISCLOSURE OF THE INVENTION

An image display control device relevant to the present invention, in which a large menu having a plurality of menu items, and an underlying image are displayed on a display unit, and menu item selection and operation are performed according to instructions by a user, includes: a controller for, according to the instructions, selecting and controlling one of either of the large menu and a small menu that has as menu items a lone portion of the menu items in the large menu; and a menu image compositor for, according to control by the controller, simultaneously displaying on the display unit the small menu together with the underlying image.

Thus, according to the image display control device relevant to the present invention, there is a benefit in that the menu operation can be performed by means of the large menu in a conventional manner, and meanwhile, for a user familiar with the menu structure of the large menu, instead of the large menu, through menu operations by means of the small menu that never occupies most portion of the screen area, the user can perform menu operations while checking how the underlying image varies by a menu operation.

BEST MODE FOR CARRYING OUT THE INVENTION

Embodiment 1

Figure 1:
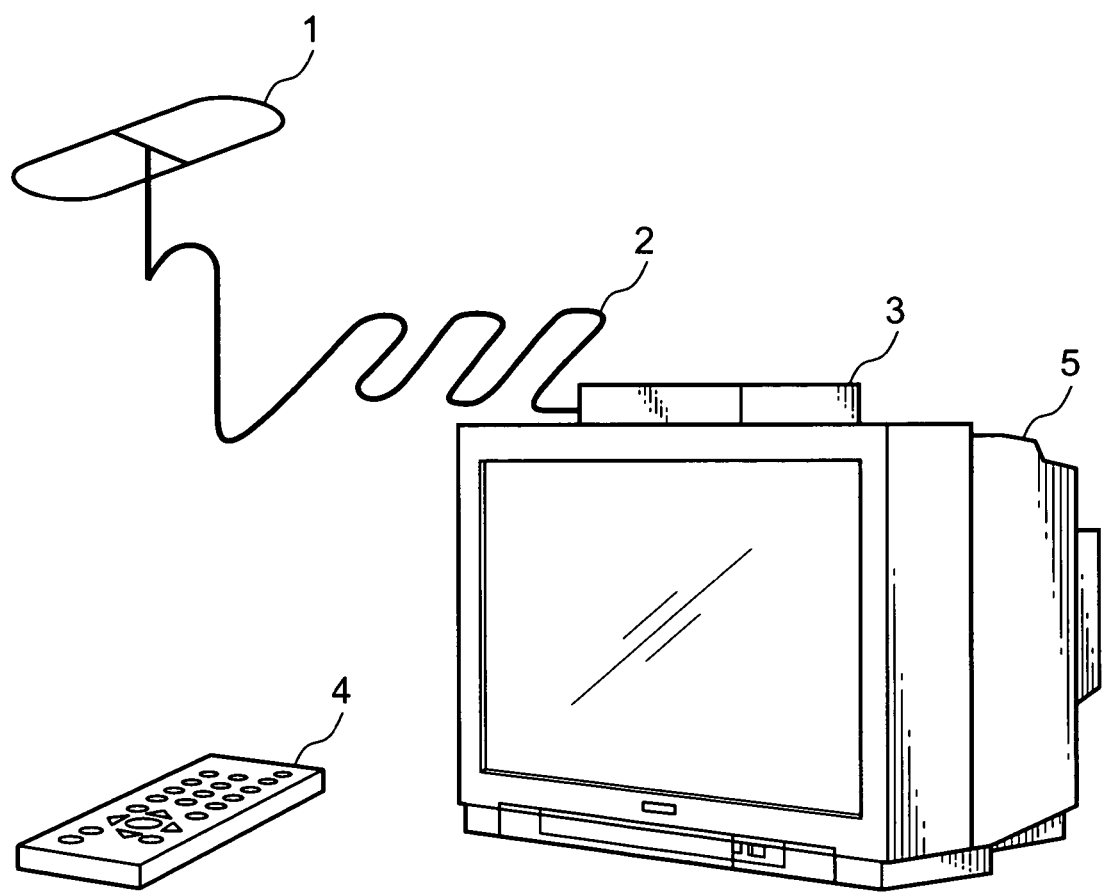
FIG. 1 is a configuration diagram illustrating a television receiving system according to Embodiment 1 of the present invention.

FIG. 1 is a configuration diagram illustrating a television receiving system according to Embodiment 1 of the present invention. In the figure, TV signals, such as VHF and UHF signals, received by a receiving antenna 1 are inputted to an image display control device 3 via a coaxial cable 2. The image display control device 3 is a device for controlling TV programs displayed on a display unit 5 based on control signals transmitted from an instruction signal transmitter 4 such as a remote control terminal. Moreover, in the example illustrated in FIG. 1, the image display control device 3 is configured in a form of a so-called set-top box, so as to control the display unit 5 from outside the display unit 5. However, the image display control device 3 can be built into the display unit 5 so as to be configured as an integrated unit.

Figure 2:
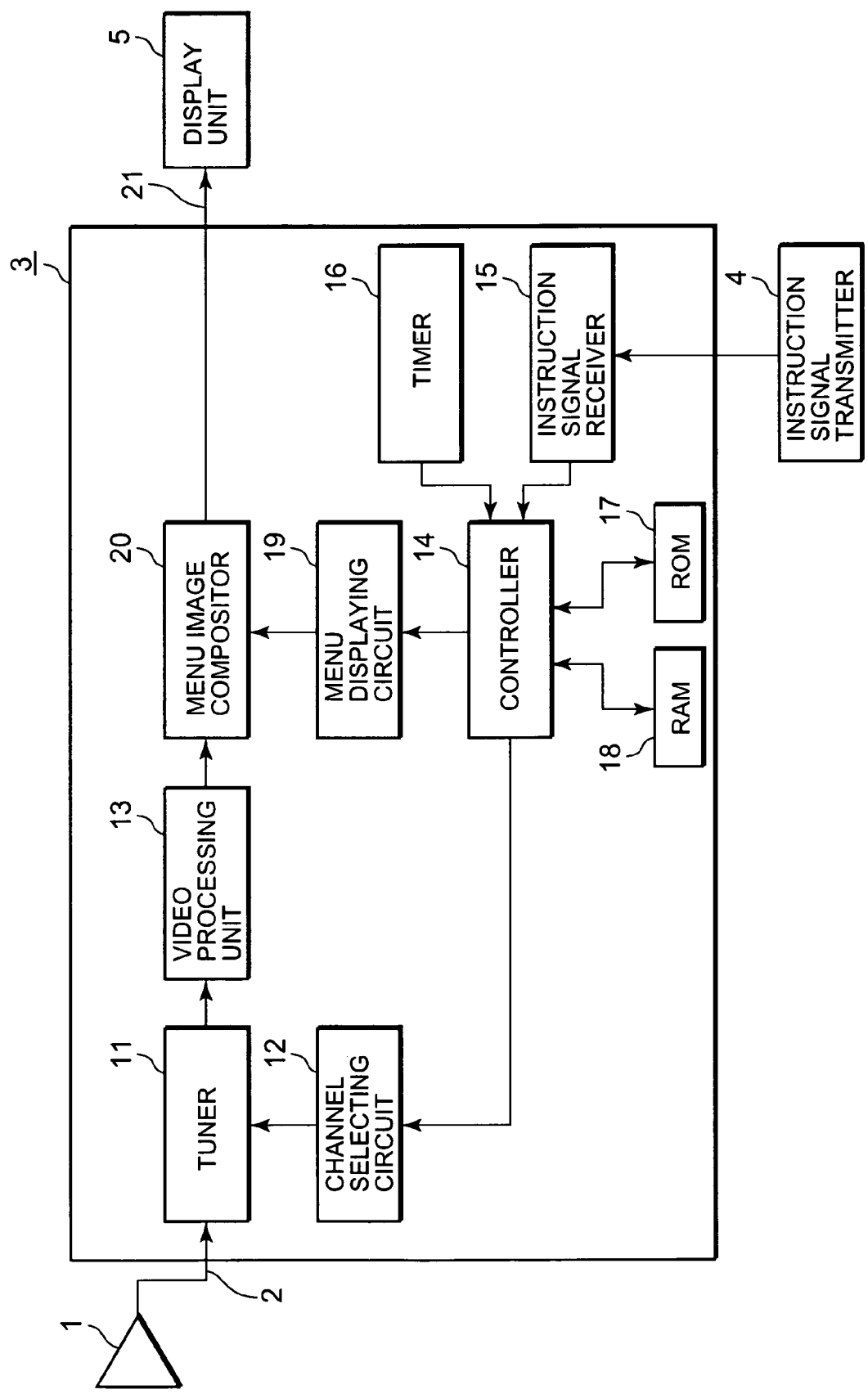
FIG. 2 is a block diagram illustrating the configuration of the television image receiving system according to Embodiment 1 of the present invention.

FIG. 2 is a block diagram illustrating the configuration of the television receiving system. In the figure, TV signals received by the receiving antenna 1 are inputted to the image display control device 3 via the coaxial cable 2. In the image display control device 3, a tuner 11 is an element or a circuit for selecting only the signals of a desired channel from received signals, and for outputting the signals. In addition, when TV signals to be inputted are digital-TV signals, the tuner 11 can include a function of a digital converter for converting TV signals that are digital signals into analog signals.

A channel selecting circuit 12 is an element or a circuit for outputting to the tuner 11 a channel selection requesting signal based on control by a later-described controller 14.

A video processing unit 13 is an element or a circuit for separating image signals and audio signals from the channel signals outputted from the tuner 11, and for converting the image signals from color TV signals into RGB signals.

The controller 14 is a component for controlling, based on variations in states of components of the image display control device 3, operations of the components, and is composed of a central processing unit (CPU).

An instruction signal receiver 15 is a circuit or an element for receiving a signal transmitted from the instruction signal transmitter 4, and for generating an interrupt signal for the controller 14, to transmit to the controller 14 a user's operational instruction performed using the instruction signal transmitter 4. The instruction signal receiver 15 is connected via an interrupt signal line to the controller 14. If the signal transmitted from the instruction signal transmitter 4 is an infrared signal, the instruction signal receiver 15 is composed of a light receiving element, and varies its electrical characteristics according to reception of infrared light, to generate a predetermined interrupt signal.

A timer 16 is an element or a circuit for generating pulse waves every constant time, composed of a crystal oscillator, and is connected to the controller 14 via an interrupt signal line. According to the generated pulse wave, an interrupt signal for the controller 14 is generated.

A ROM 17 is a nonvolatile storage element or circuit for storing data such as instruction codes of a microcomputer program executed in the controller 14, menu templates defining menu item structures, image data for displaying menus, and font data used for displaying the menus. Stored data can be retrieved by specifying its address. In addition, it is preferable to configure the ROM 17 with flash memories. It is because, even if power-off occurs, the last operational state just before the power-off can be stored.

However, it is not required to configure the entire ROM 17 with flash memories. It is possible that flash memories are used only to store, for example, operational content, and generally used ultraviolet-erasable EPROMs (erasable programmable read-only memories) are used for other data such as program codes and image data; Moreover, it is not mandatory to use flash memories because the feature of the ROM 17 to store the previous operation content does not directly relate to features of the present invention. In addition, meaning of words such as "large menu", "small menu", and "menu cursor" will be described later.

A RAM 18 is a volatile storage element or circuit for storing temporary data required by the computer program executed in the controller 14. Stored data can be retrieved by specifying its address as in the ROM 17.

A menu displaying circuit 19 is a circuit for generating, according to a control signal from the controller 14, RGB signals for menu images in combination with image data and font data for displaying menus, stored in the ROM 17. A menu image compositor 20 is a circuit or an element for realizing a so-called picture-in-picture function, in which the video processing unit 13 incorporates RGB signals outputted from the menu displaying circuit 19 into a screen image by RGB signals separated from the television signals.

A D-terminal cable 21 is a cable for transmitting image signals outputted from the menu image compositor 20 to the display unit 5.

(Configuration of the Instruction Signal Transmitter 4)

Figure 3:
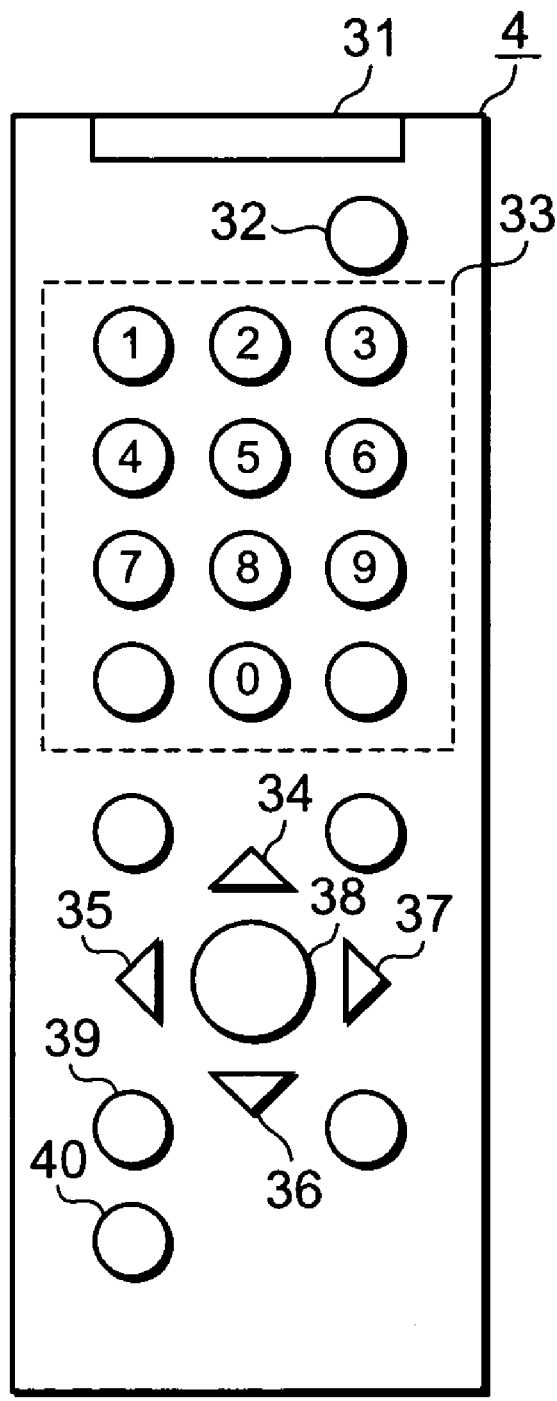
FIG. 3 is a front view illustrating an example of an instruction signal transmitter according to Embodiment 1 of the invention.

Next, the configuration of the instruction signal transmitter 4 will be described. FIG. 3 is a front view of the instruction signal transmitter 4. In the figure, a signal irradiating unit 31 is a component for irradiating radio waves or infrared light according to a user's operation on the instruction signal transmitter 4.

A power-on/off button 32 is a button that is pressed when the image display control device 3 is remotely powered on or powered off. In a case in which the image display control device 3 is integrated with the display unit 5, instead of the power-on/off of the image display control device 3, the display unit 5 can be powered on or off. Buttons 33 are buttons that are used for inputting numerals or the like, and used for selecting channel numbers or the like. A button 34 is a button that is operated when a cursor (a particular indicator for enabling a menu item currently selected by the user to be identifiable, hereinafter simply referred to as a "menu cursor") on the menu displayed on the screen of the display unit 5 by the image display control device 3 is moved upward. Moreover, the button 35 is a button that is operated to move the menu cursor to the left. Similarly, the button 36 is a button that is operated to move the menu cursor downward, and the button 37 is a button that is operated to move the menu cursor to the right. In addition, the buttons 34 through 37 are generically referred to as item moving keys or item moving buttons.

A button 38 is a button that is operated to select and determine the menu item on which the menu cursor is displayed, or to decide the numerals inputted by the buttons 33.

A button 39 is a button for controlling display/nondisplay of a menu. More specifically, when a menu is in display, if the user operates the button 39, then the menu is hidden; and meanwhile, when the menu is not in display, if the user operates the button 39, then the menu is displayed.

A button 40 is a menu switching button, which is operated to select a plurality of menu displaying methods presented by the present invention.

In addition, in the above explanation, "to operate the button" means an operation such as pressing the button, or more generally, means a user's action to generate a certain signal by letting a sensor circuit for each button, which are installed in the image display control device 3 and not illustrated, detect on/off of a switch due to the user's action, or detect variations in electrical characteristics of a piezoelectric device or a non-contact electrostatic device.

Moreover, although the buttons are disposed on the front face of the instruction signal transmitter 4 in the example, instead of the buttons 34 through 37 and the button 38, an operational unit such as a joystick can be provided.

(Operation of the Television Receiving System)

Next, the operation of the television receiving system will be described. In the television receiving system, the receiving antenna 1 firstly receives television broadcasting signals such as VHF signals and UHF signals, and the tuner 11 extracts only the signal of a desired channel from the received signals. Then, the video processing unit 13 separates an image signal and an audio signal from the channel signal, to output the image signal to the menu image compositor 20, and to output the audio signal to a speaker via an audio amplifier that is not illustrated. The menu image compositor 20 composes a single image from the image signal outputted by the video processing unit 13 and the menu image signal outputted by the menu displaying circuit 19, and outputs the composed image signal to the display unit 5.

Meanwhile, according to the signal from the instruction signal transmitter 4 operated by the user, the image display control device 3 displays a menu on the display unit 5, so that channel selection, adjustment of the image and the sound volume, and other operations can be performed.

Hereinafter, the above-described processing will be described more specifically. The processing in the image display control device 3 is composed of processing for generating an event based on an interrupt signal generated from the instruction signal receiver 15 or the timer 16 to store the event in a queue (a waiting line), and processing for taking out the event stored in the queue to control each component of the image display control device 3 in accordance with the type of the event. Hereinafter, the former processing is referred to as interrupt handling, and the latter processing is referred to as event handling.

Firstly, the relationship between the interrupt handling and the event handling will be described. In a steady state, the controller 14 is executing the event handling. When an interrupt signal is externally inputted to the controller 14, the controller 14 suspends the event handling, and executes the interrupt handling. And, when the interrupt handling is completed, the controller 14 resumes the event handling that has been suspended.

The following is a more detailed explanation of the above-described processing. When an interrupt signal is inputted to the controller 14, the controller 14 transfers the content of an instruction pointer (a register for storing an address from which an instruction stream is taken out) to a save area (a stack) allocated in the RAM 18, and then transfers the start address of the instruction code stream for the interrupt handling to the instruction pointer (the register for storing an address from which an instruction stream is taken out), to start the interrupt handling.

(Interrupt Handling)

Figure 4:
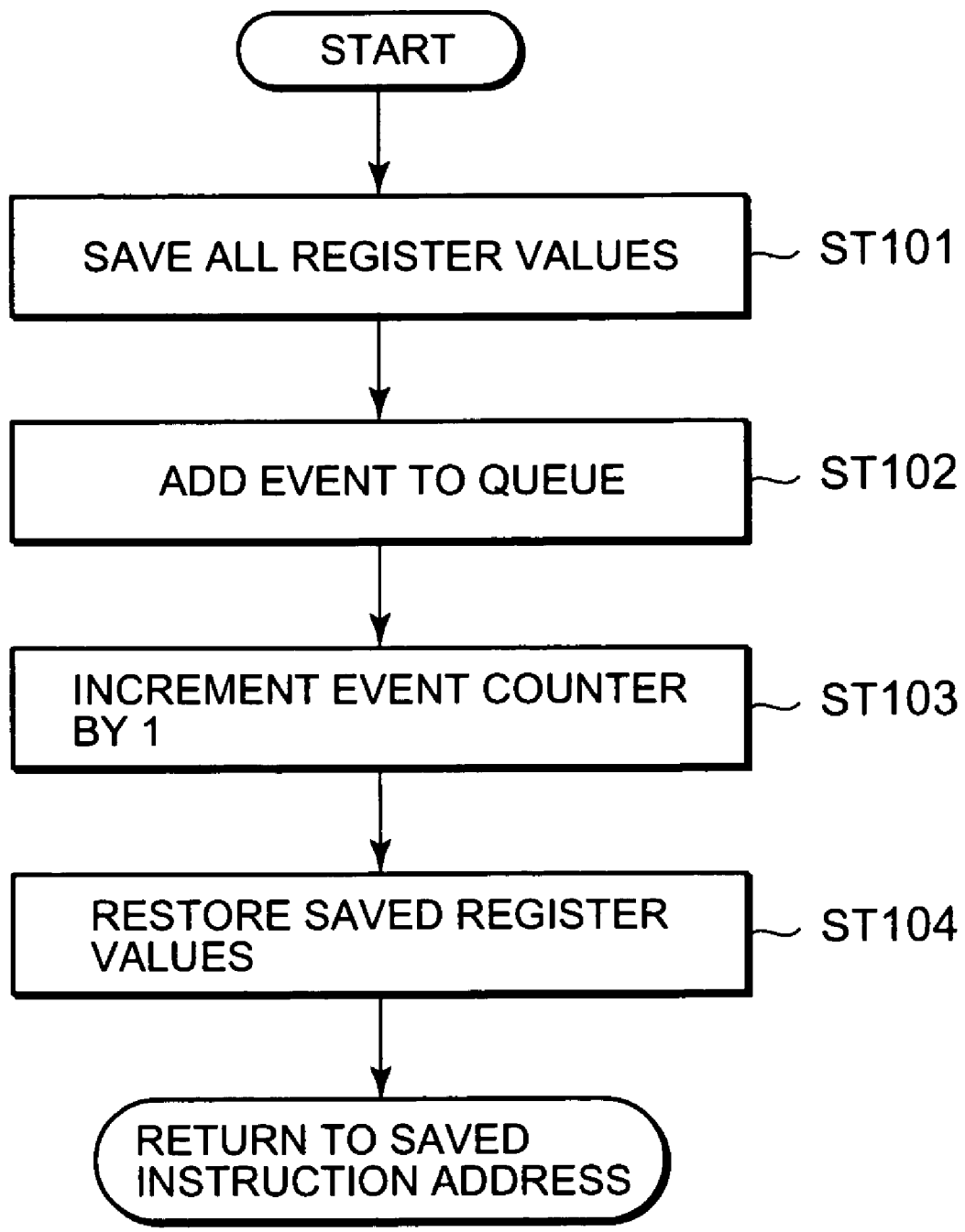
FIG. 4 is a flowchart for an interrupt signal processing in the television receiving system according to Embodiment 1 of the present invention.

Next, details of the interrupt handling will be described. FIG. 4 is a flowchart of the interrupt handling. Prior to the handling, the controller 14 receives an interrupt signal from a component such as the instruction signal receiver 15 or the timer 16. The interrupt signal is a signal that is generated irregularly from the viewpoint of the controller 14, and is generated independently of the currently executing event handling. When the interrupt signal is received, the controller 14 starts executing the instruction code stream for the interrupt handling. Firstly, in step ST101 in the figure, the controller 14 saves to the stack area all the register values except the instruction pointer. The procedure is a procedure necessary for resuming the former procedure after the interrupt handling is completed.

Figure 5:
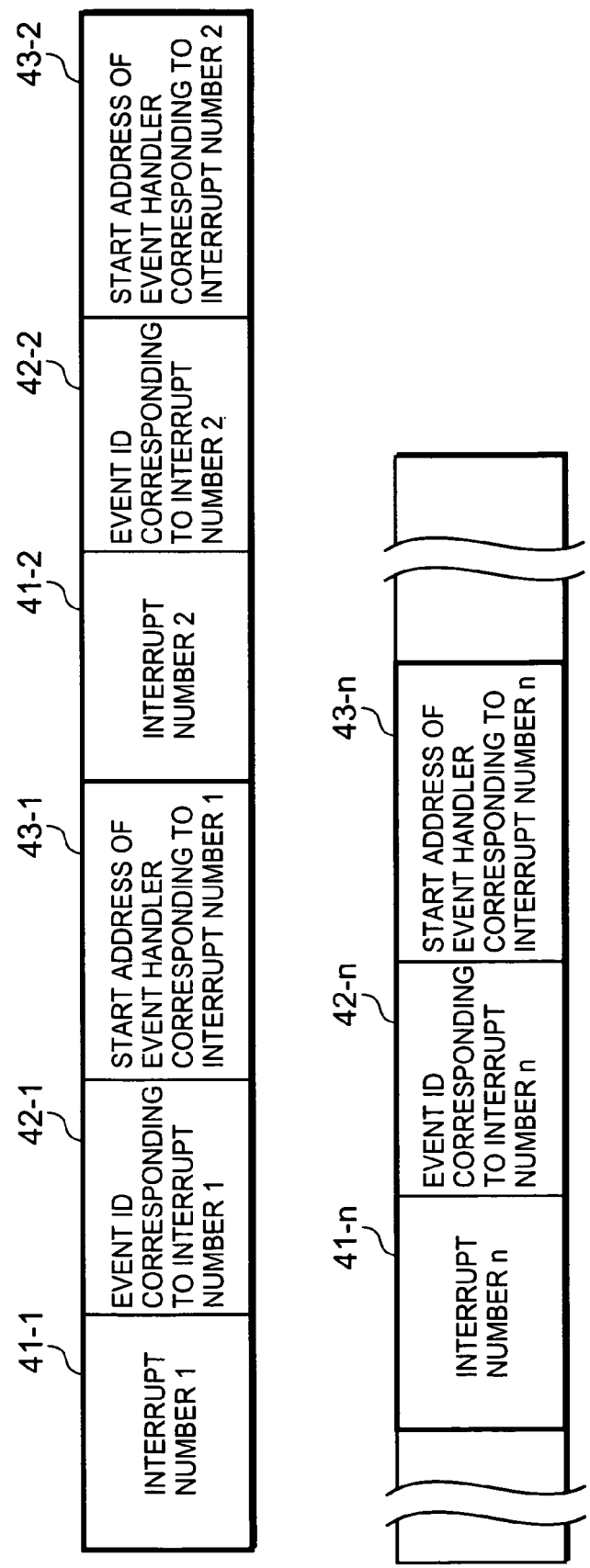
FIG. 5 is a diagram illustrating memory mapping for an interrupt vector table according to Embodiment 1 of the invention.

Then, in step ST102, the controller 14 refers to an interrupt vector table, and adds to the queue an event corresponding to the interrupt signal. The interrupt vector table indicates a storage area in the ROM 17, for storing the correspondence between the interrupt and the event, and the start address of the instruction code stream for an event handler exclusively for each event. FIG. 5 is a diagram illustrating memory mapping for the interrupt vector table. In the figure, an area with numeral 41-1 is an area for storing an interrupt number 1 (a specific number is given), and an area with numeral 42-1 is an area for storing an ID number of the event corresponding to the interrupt number 1. In addition, an area with numeral 43-1 is an area for storing the start address of an instruction code stream of the event hander corresponding to the interrupt number 1. Moreover, for the interrupt number 2, areas with numeral 41-2, numeral 42-2, and numeral 43-2 are allocated, in which an interrupt number 2, an event ID thereof, and the start address of the event handler are stored. Subsequently, for other interrupt numbers, a group of an interrupt number, an event ID, and an event handler is likewise stored in this order.

Furthermore, an example of the configuration allocating different values for the interrupt number 2 and the event ID has been described here. However, a configuration allocating an identical value for the both can be used. In addition, if the both have an identical value, it is not required to allocate different areas for the interrupt number and the event ID in the interrupt vector table.

Figure 6:
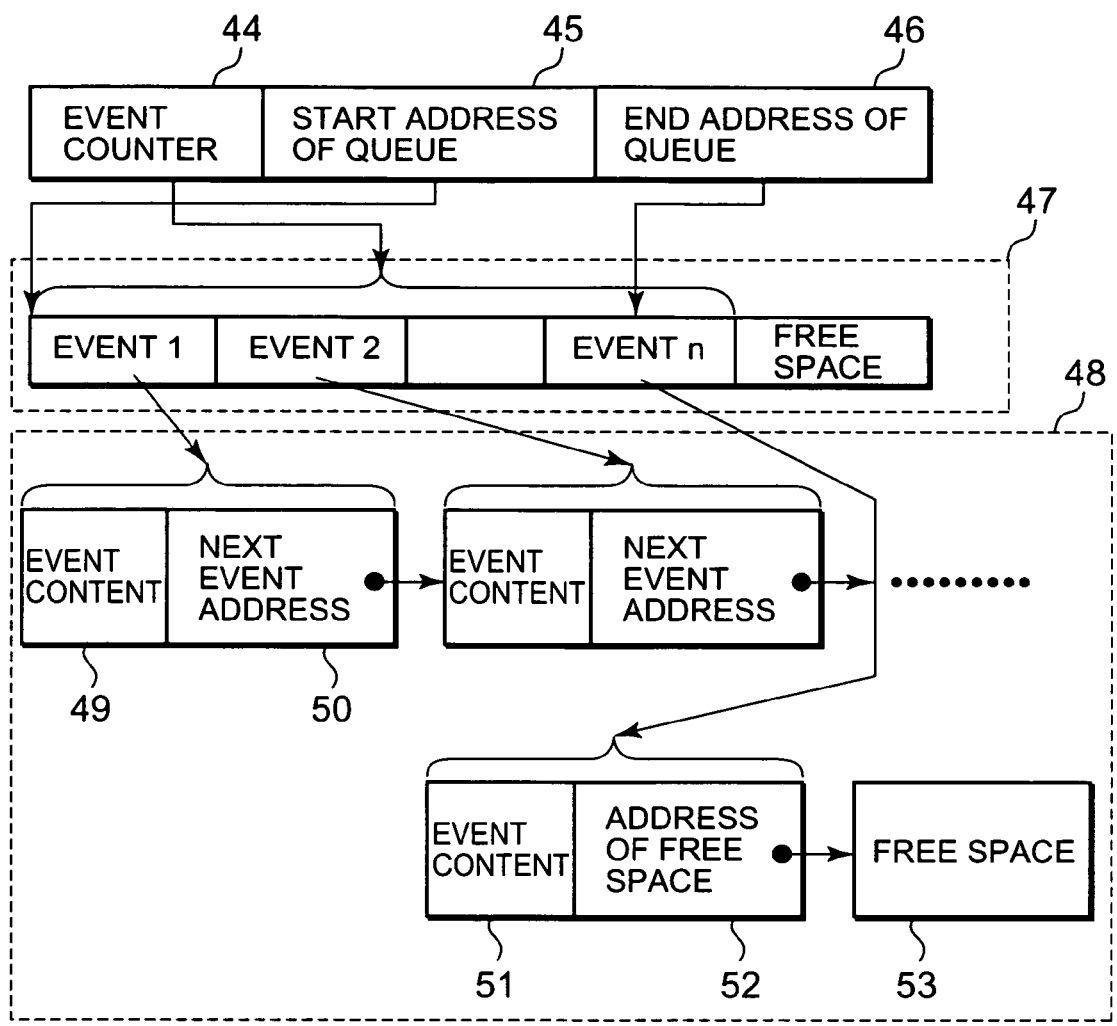
FIG. 6 is a diagram illustrating memory mapping for an event queue according to Embodiment 1 of the invention.

Next, the configuration of the queue will be described. The queue is a storage area in the RAM 18 for storing a plurality of events based on the FIFO (first-in first-out) rule. Specifically, a management section including three components—an event counter, the start address of the queue, and the end address of the queue, and an event storing section for actually storing events are provided. FIG. 6 is a diagram illustrating an example of memory mapping for such a queue. In the figure, the event counter 44 is an area for storing the number of events that are stored in the queue. Moreover, the start address 45 of the queue is an area for storing the address of the area for storing the event at the top of the queue. The end address 46 of the queue is an area for storing the address of the area for storing the last event in the queue. Here, the queue stores events based on the FIFO rule, so that the event stored in the area of the address preserved in the start address 45 of the queue is the oldest event, and is the event to be, processed first. And, the event stored in the area of the address preserved in the end address 46 of the queue is the newest event, and is the event to be processed last.

Also in FIG. 6, the event storing section 47 is an area for storing one or more events. The portion surrounded by numeral 48 in the figure is a diagram for explaining in more detail the state of the event storing section 47. Here, the events stored in the event storing section 47 are referred to as Event 1, Event 2, . . . , and Event n. Event 1 is composed of an event content 49 and the next event address 50. The event content 49 is an event ID of the event. And, the next event address 50 is an area for storing the address of a storage area in which Event 2 is stored. All events after Event 2 have the similar structures. More specifically, the event storing section 47 is a storage area expressed as data with list structures, so that the data is not necessarily sequentially stored in the order of Event 1, Event 2, . . . , and Event n. And, for the last Event n, an event content 51 and the address 52 of a free space 53 are stored.

In step ST102, the controller 14 adds the event to the queue. In the processing, the area in which the last Event n is stored is obtained by the end address 46 of the queue being referenced, then the address of the free space 53 of the last event n is stored in the end address 46 of the queue, and meanwhile a new event ID and the next free space address are stored in the address of the free space 53.

In step ST103, "1" is added to the number of events stored in the event counter 44, and the result is re-stored in the event counter 44.

Next, in step ST104, all the register values saved in step ST101 are transferred to each of the registers, to restore the register values. Then the instruction pointer value is restored, and the interrupt handling is terminated.

As described above, events are registered in the queue. Meanwhile, during the time other than the time while interrupts are handled, the following event handling is performed.

(Event Handling)

Figure 7:
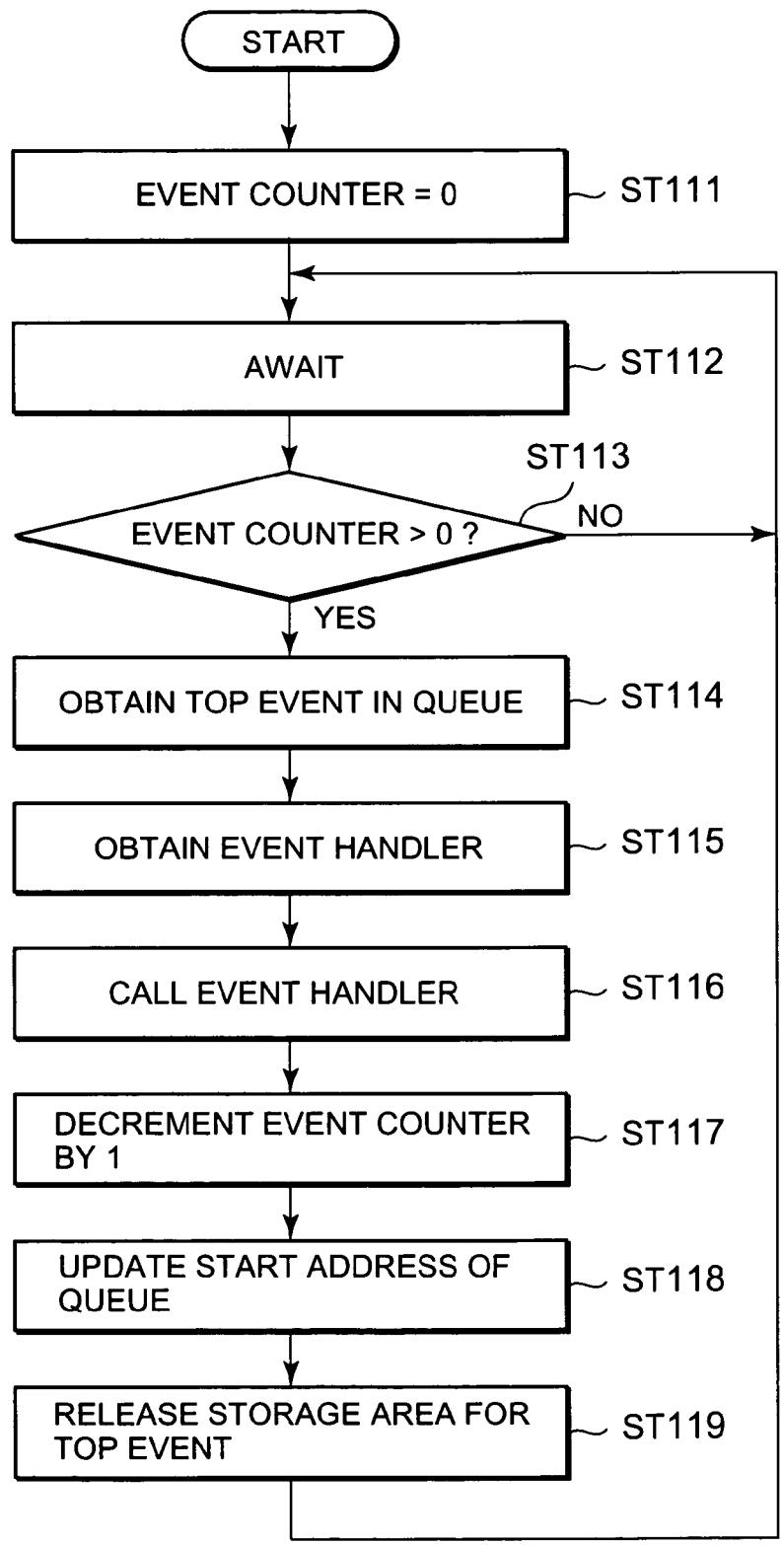
FIG. 7 is a flowchart for an event handler according to Embodiment 1 of the invention.

FIG. 7 is a flowchart of the event handling by the controller 14. Firstly, in step ST111, the controller 14 initializes the event counter 44 to "0" under the condition in which no events are present immediately after the power-on. Next, in step ST112, the handling awaits for a predetermined time. More specifically, timekeeping is performed using interrupt signals due to pulses generated by the timer 16, and execution of an NOP instruction (no operation: an instruction doing nothing) is continued until a predetermined time elapses. However, this processing is not mandatory, and is omissible. Next, in step ST113, whether the value of the event counter 44 is larger than zero is checked. When the value of the event counter 44 is larger than zero, step ST112 recurs. Meanwhile, when the value of the event counter 44 is larger than zero, step ST114 ensues.

In step ST114, the start address 45 of the queue, stored in the queue management section, is referenced, and the top event in the queue is obtained. Next, in step ST115, the interrupt vector table is searched to get the position where the event ID of the event is stored, and the start address of the event handler corresponding to the event ID is obtained. Then, in step ST116, the event handler is called to handle the event. Moreover, the content of each event handler will be described later. Next, in step ST117, the value of the event counter 44 is decremented by "1". Subsequently, in step ST118, the value of the start address 45 of the queue is updated to the address of the area in which the next event is stored. In step ST119, the storage area that the previous top event has occupied is released. Then step ST112 recurs again. The flowchart in FIG. 7 illustrates the processing that is being executed until the image display control device 3 is powered off, and is never terminated.

(Menu Display/Nondisplay Processing)

Next, the operation when the user operates the button 39 of the instruction signal transmitter 4, more specifically, the menu display/nondisplay button will be described. When the user operates the button 39, the instruction signal transmitter 4 irradiates from the signal irradiating unit 31 a signal of infrared light or the like. Then the instruction signal receiving unit 15 detects the signal, and transmits an interrupt signal to the controller 14. The controller 14 transforms by means of the interrupt handling the interrupt signal into an event, which is stored in the queue. Next, in the event handling, because the value of the event counter 44 is not zero (step ST113), the event caused by the user's operation on the button 39 is taken out of the queue (step ST114), and an event handler corresponding to the event is retrieved from the interrupt vector (step ST115), so that the event handler for the menu display/nondisplay switching processing due to the operation on the button 39 is executed.

Figure 8:
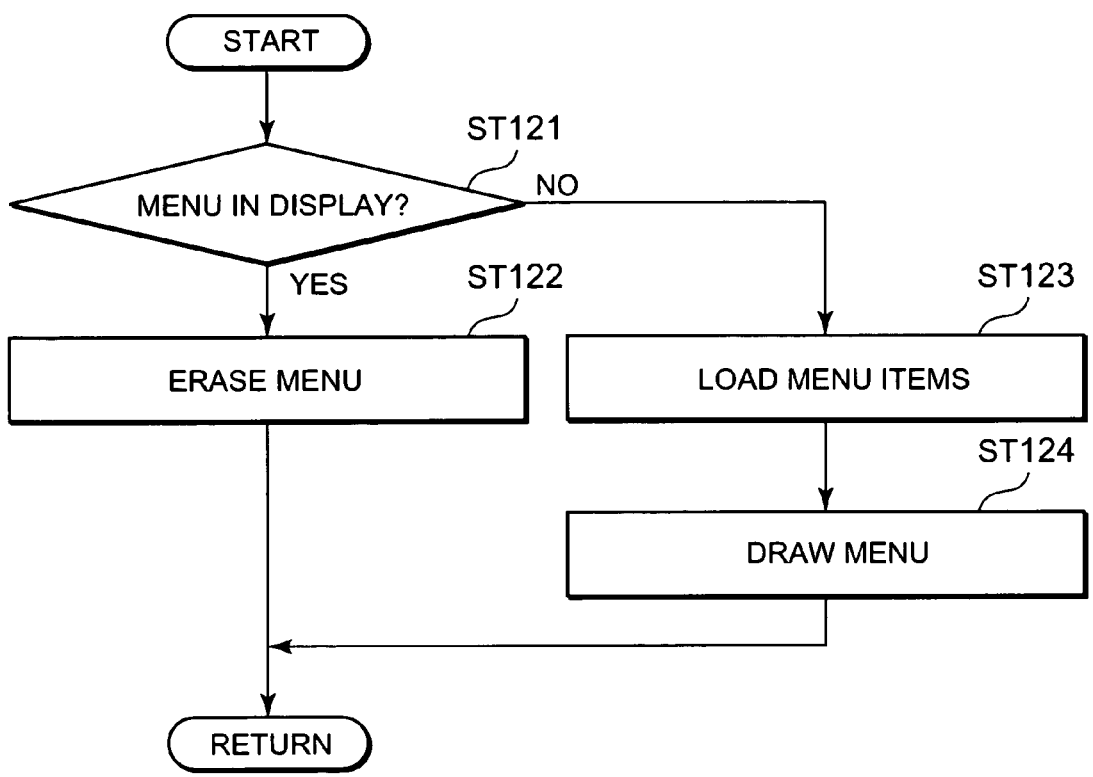
FIG. 8 is a flowchart for menu drawing processing according to Embodiment 1 of the invention.

FIG. 8 is a flowchart of the event handler for the menu display/nondisplay switching processing. In step ST121 in the figure, the controller 14 checks whether the menu is currently displayed. If the menu is in display, step ST122 ensues. In step ST122, the controller 14 erases the menu. For this purpose, the controller 14 transmits via an internal bus a control signal to the menu displaying circuit 19, to inform of discarding the menu. Then, when receiving the control signal informing of discarding the menu, the menu displaying circuit 19 stops outputting the RGB signals that have been outputted to the menu image compositor 20 for displaying the menu. When the RGB signal output from the menu displaying circuit 19 is stopped, the menu image compositor 20 stops the picture-in-picture processing, and composes a screen image only from the RGB signals from the video processing unit 13. The above-described is the menu erasing processing in step ST122. After that, the menu display/nondisplay event handler is terminated, and step ST117 of the event handling recurs.

Figure 9:
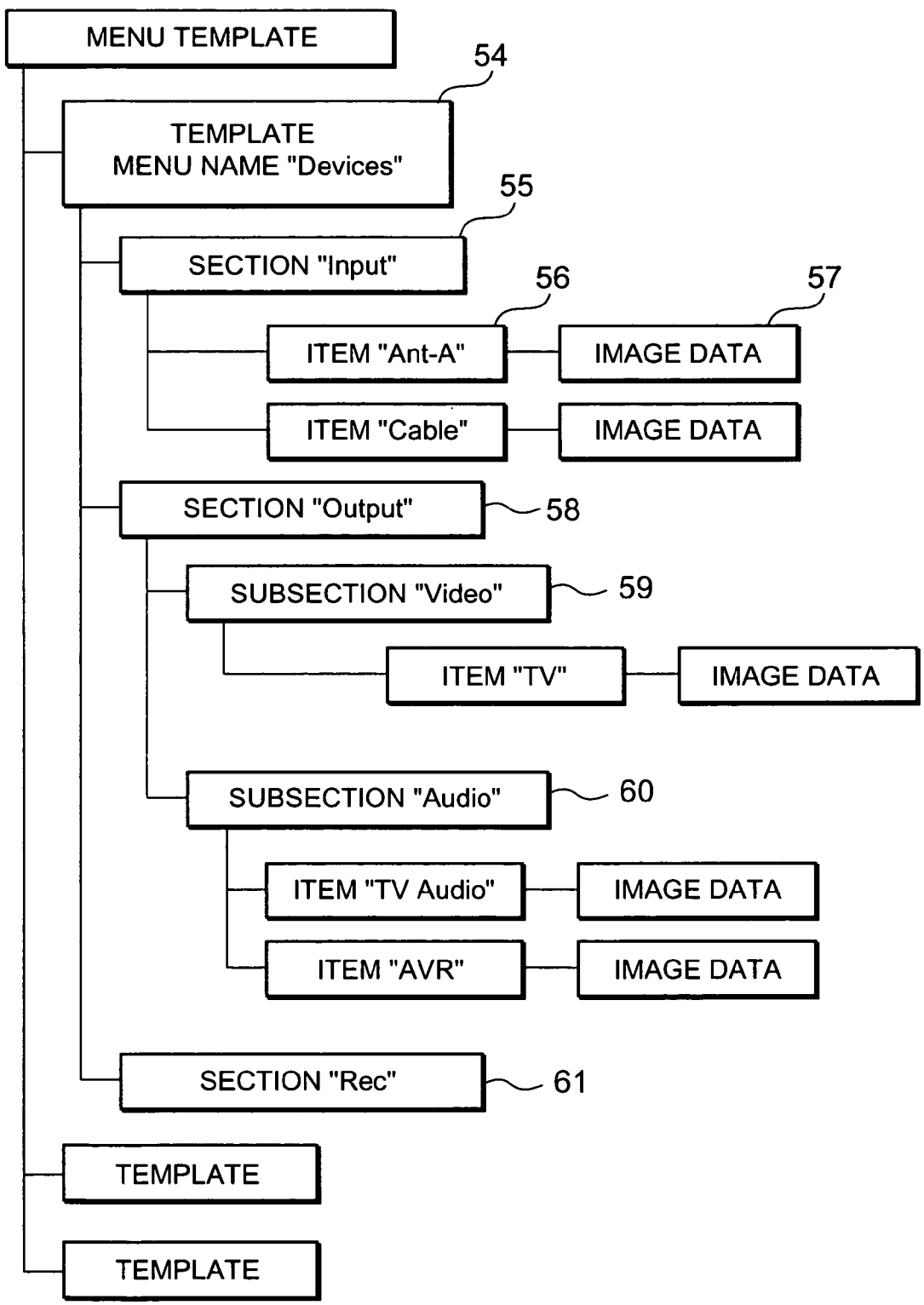
FIG. 9 is a tree diagram logically expressing a hierarchical structure of data included in a menu template.

Meanwhile, in step ST121, if the controller 14 decides that the menu is not in display, step ST123 ensues. In step ST123, the controller 14 loads a menu template from the ROM 17. Here, the menu template means data that defines, for instance, a plurality of menu items and relations among the menu items. More specifically, the menu template is a data structure in which data is hierarchically arranged. FIG. 9 is a tree diagram logically expressing a hierarchical structure of data included in such a menu template. As illustrated in the figure, firstly in the menu template, as the first hierarchy, a data unit referred to as a template, such as a template 54, is provided. One or more templates are present. Each of the templates is entitled a menu name (for example, "Devices"). The menu name is an identifier or a name, whose duplication with others is not allowed. The menu name is referenced by the controller 14 during processing of the menu, and is directly displayed on the display unit 5, so that the user recognizes from the name what the menu is for. Therefore, it is preferable that a recognizable name is entitled. However, this is not directly related to the features of the present invention.

Below the template 54, a hierarchy referred to as a section is provided. One or more sections are present for each template. Each of the sections is entitled an identifier or a name, whose duplication is not allowed in the same template. In the example, a section 55 is entitled "Input", for instance, a section 58 is entitled "Output", and a section 62 is entitled "Rec". When the menu is displayed, the section name is used as a character string that is also directly displayed to the user, so that it is preferable that a recognizable name is entitled.

Below the section, a hierarchy referred to as a menu item is provided. For example, below the section 55, a menu item 56 is provided. The menu item is entitled a character string being the title of the menu item. For example, the item 56 is entitled a name "Ant-A". This name is a character string that is directly displayed in each menu item. In addition, information for identifying the image data stored in the ROM 17 is provided for each menu. As the information for identifying image data, the value of the address in the ROM 17, where each image data is stored, can be used without modification for identifying the information, or if the information is managed by a file system, its file name can be attached.

Meanwhile, instead of providing a menu item directly below the section, a hierarchy referred to as a subsection can be provided. For example, below the section 58, subsections 59 and the like are provided. The subsections are likewise entitled names that can be uniquely identified. For example, the subsection 59 is entitled a name "Video", and a subsection 60 is entitled a name "Audio". These names are directly displayed on the display unit 5 as character strings.

Although, in order to logically express the relations among data constituting the menu template, the configuration of the menu template has been illustrated as a tree diagram in FIG. 9, in practice, the data can be expressed in binary format, or the data can be expressed by a structured text file such as an HTML document or an XML document. In short, the data can be expressed in any format as long as the data format can express such a hierarchical structure.

Next, in step ST124, the controller 14 composes from the menu template a menu image, which is outputted to the menu displaying circuit 19. Here, menus include large menus and small menus. A large menu is a type of menu display that obscures most of the display in the display unit 5. A large display area can be used with the large menu, so that a lot of menu items or detailed information can be displayed. A small menu is a type of menu display that obscures only a portion of the display. Only a small display area can be displayed with the small menu, so that the number of menu items to be displayed is limited. However, because the small menu occupies only a portion of the display, a screen image (an underlying image) by RGB signals outputted from the video processing unit 13 can be displayed in the area other than the small menu display area. Accordingly, there is a benefit in that the menu operation can be carried out while checking a current status of the display or a channel content such as a TV program.

If the menu that has been immediately precedingly displayed is a large menu, the controller 14 composes a menu image of a large menu as a newly displayed menu. Meanwhile, if the menu that has been immediately precedingly displayed is a small menu, a small menu is composed as a newly displayed menu. In addition, the type of the immediately precedingly displayed menu is stored in the ROM 17. Configured as above, even if a power-off occurs between the last displaying of the menu and the new displaying of the menu, memory of the last menu type is preserved.

Figure 10:
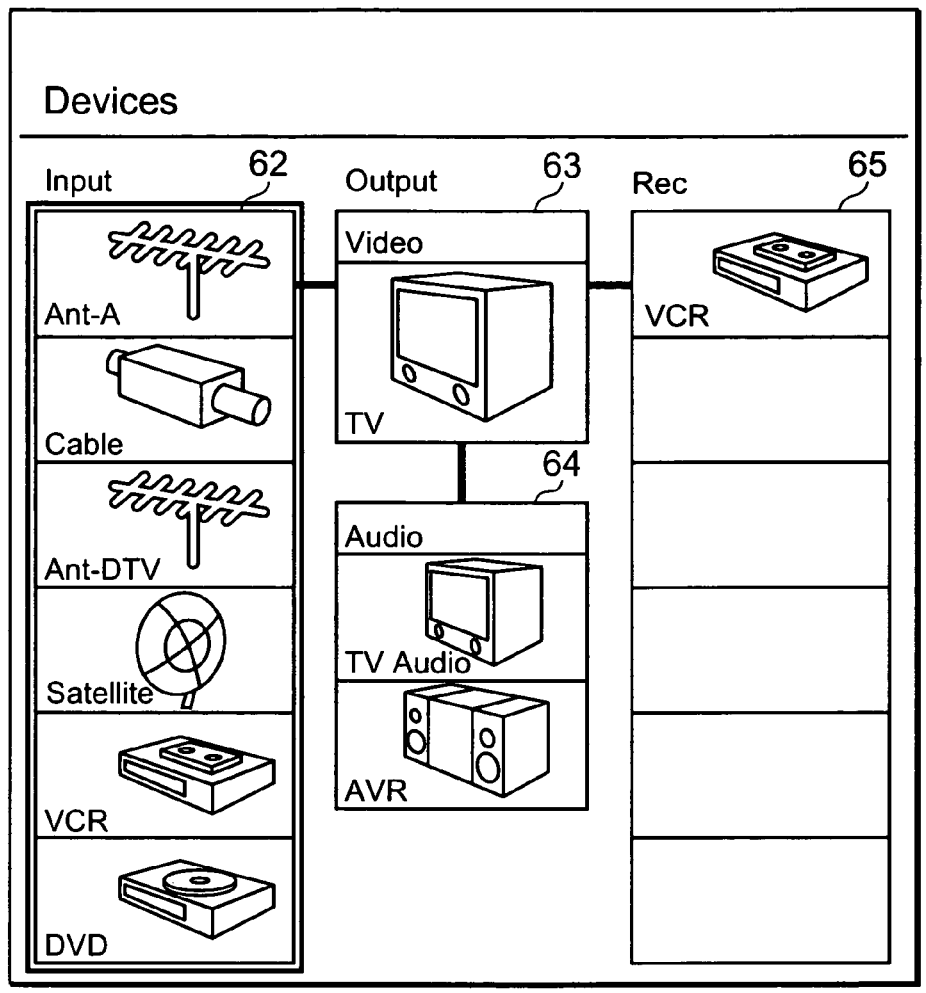
FIG. 10 is a front view of a large menu displayed by the television receiving system according to Embodiment 1 of the present invention.

When the menu image generated by the controller 14 as described above is inputted, the menu displaying circuit 19 converts the menu image into RGB signal, and outputs the signal to the menu image compositor 20. The menu image compositor 20 composes the RGB signal outputted by the video processing unit 13 and the RGB signal outputted by the menu displaying circuit 19 by means of picture-in-picture, and outputs the result to the display unit 5. FIG. 10 is an example of a menu image of a large menu, composed as described above. This figure illustrates the example of converting the template "Devices" in the menu template in FIG. 9 into a menu image. A rectangle indicated by numeral 62 in FIG. 10 corresponds to the section 55 in the menu template; a rectangle indicated by numeral 63 corresponds to the subsection 59 in the menu template; a rectangle indicated by numeral 64 corresponds to the subsection 60; and a rectangle indicated by numeral 65 corresponds to the section 61.

Figure 11:
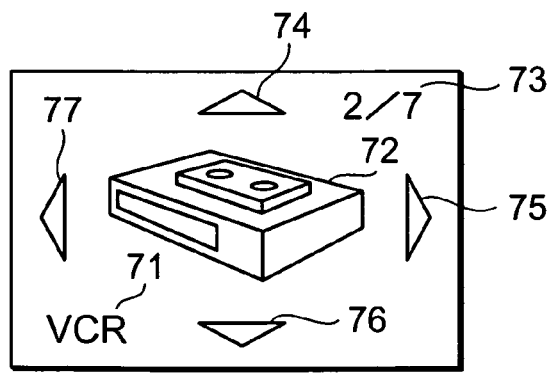
FIG. 11 is a front view of a small menu displayed by the television receiving system according to Embodiment 1 of the present invention.
Figure 12:
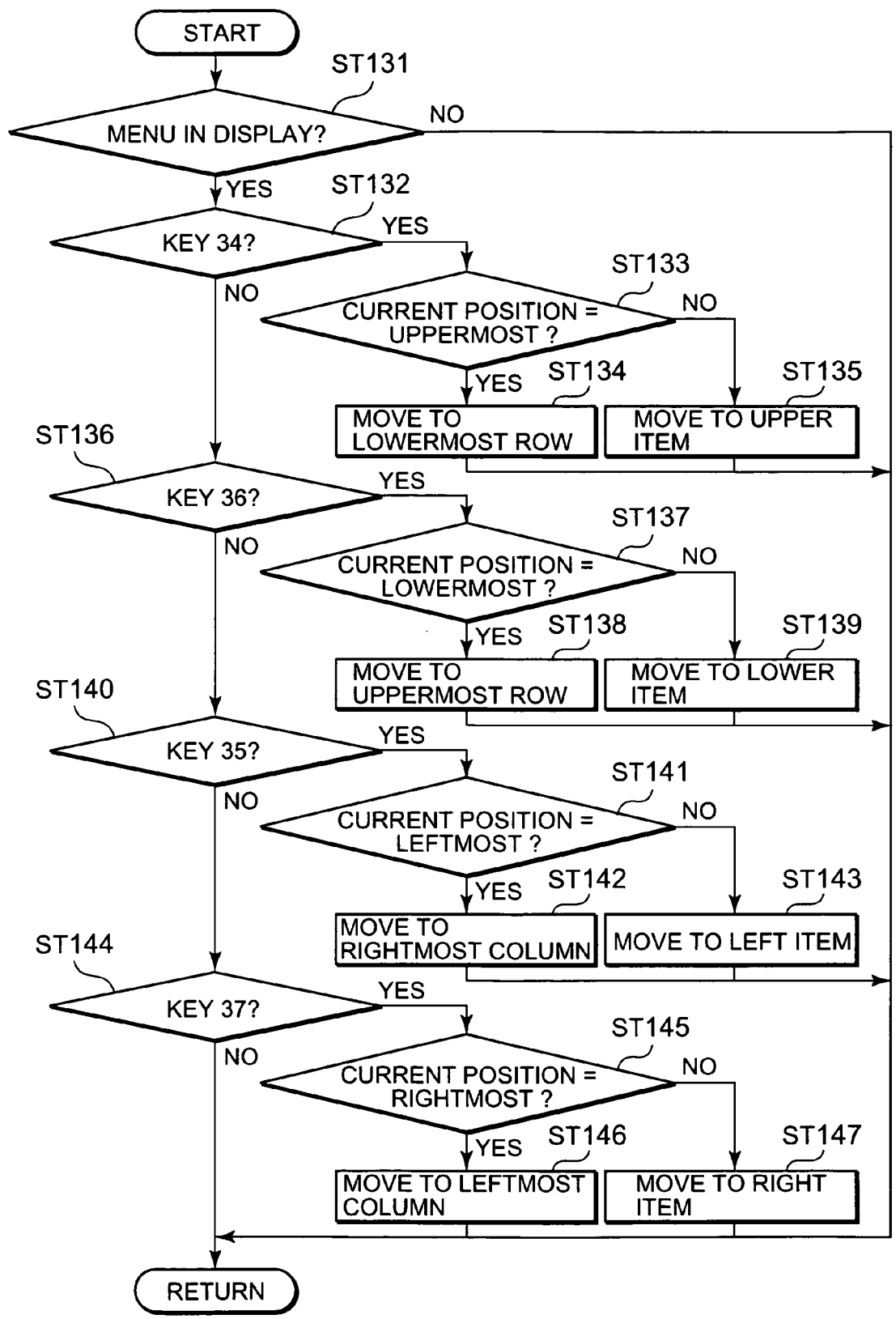
FIG. 12 is a flowchart for menu item movement processing according to Embodiment 1 of the invention.

FIG. 11 is an example of a small menu that is also composed in step ST124. In the figure, numeral 71 indicates a character string of the menu item title for the small menu. Numeral 72 indicates a graphical image corresponding to the menu item. Numeral 73 denotes information on where the small menu is positioned in the section or the subsection. The information is displayed as "n/m", for instance. Here, "m" is the total number of menu items in the section or the subsection. And, given that the top menu item in the section or the subsection is "1", "n" is the order of the current menu item. Thus, by displaying the information on the total number of menu items and the position of the current menu item, in spite of the small menu, the structure of the entire menu can be indicated to the user, so that, even if the display area is limited, the operability is never lowered.

In addition, arrows indicated by numerals 74 through 77 are signs for indicating that the menu cursor can move in the directions of the arrows. In this example, only the arrow 77 is displayed in light color, and the arrows 74 through 76 are displayed in deep color. Configured as above, it is indicated to the user in an understandable way that another menu item is present in the direction indicated by the arrow displayed in deep color. Moreover, even if, instead of displaying the arrow 77 in light color, the arrow is not displayed, the same effect can be achieved.

At the last of the processing in step ST124, the type of the displayed menu (a large menu or a small menu) is stored in the ROM 17. After that, the controller 14 terminates the menu display/nondisplay event handler, and step ST117 of the event handling recurs to continue the next event handling.

(Menu Selecting Operation)

Next, the operation when the user operates the buttons 34 through 37, or more specifically the menu cursor moving buttons, of the instruction signal transmitter 4 will be described. When the user operates the buttons 34 through 37, in the same way as for the menu display/nondisplay button 39, an interrupt is finally converted into an event, which is stored in the queue. Next, in the event handling, because the value of the event counter 44 is not zero (step ST113), the event caused by the user's operation on any of the buttons 34 through 31 is taken out of the queue (step ST114), and an event handler corresponding to the event is retrieved from the interrupt vector (step ST115), so that the event handler for the menu cursor movement processing by operating the buttons 34 through 37 is executed.

FIG. 11 is a flowchart of the event handler for the menu cursor movement processing. In step ST131 in the figure, the controller 14 determines whether the menu is currently displayed. If the menu is not in display, the event handler for the menu cursor movement processing is terminated, and step ST117 recurs.

Meanwhile, in step ST131, if it has been decided that the menu is in display, step ST132 ensues. Then in step ST132, whether the operated key is the key 34 is checked. If it is the key 34, then step ST133 ensues, to check whether the current cursor position is on the uppermost menu item of the section/subsection. If the position is on the uppermost menu item, step ST134 ensues; and if the position is not on the uppermost menu item, step ST135 ensues. In step ST134, the controller 14 moves the menu cursor to the lowermost menu item of the section or the subsection. In addition, when the menu cursor is moved, the menu image of the menu item on which the menu cursor has been present, and the menu image of the menu item to which the menu cursor is newly moved are necessary to be updated. Details of the processing for updating the menu images when the menu cursor is moved will be described later.

In step ST135, the menu cursor is moved to the next menu item up of the section or the subsection. Here, the processing for moving the menu cursor will be specifically described. When the displayed menu is a large menu, "to move the menu cursor" means to return to a normal state the display of the menu item on which the menu cursor has been present, and to change the display of the new menu item so that the user can see that the menu cursor is present on the new menu item.

As a displaying method for making it recognizable that the menu cursor is present on the new menu item when the large menu is in display, there is, for example, a method of performing an exclusive OR operation between the bit pattern of RGB values ("0xFF", "0xFF", "0xFF") and the menu image of the new menu item. The benefit of the method is as follows. Specifically, when the menu cursor is moved to another menu item, the current menu item needs to be returned to the original display. In this case, with the method using an exclusive OR, by calculating once again an exclusive OR between the same bit pattern of RGB values ("0xFF", "0xFF", "0xFF") and the current-state menu image, the original menu image can be restored. Therefore, the display of the cursor movement can be realized by the extremely simple computation.

Likewise as above, there is another method of determining the RGB values when the menu cursor is present, to be the results of subtracting each component of the RGB values of the menu image from ("0xFF", "0xFF", "0xFF"). For example, when the original RGB values of the menu image are ("0x64", "0x80", "0x72"), the results of subtracting each component from ("0xFF", "0xFF", "0xFF") are ("0x9B", "0x7F", "0x8C"), which are used for the RGB values when the menu cursor is present. When the menu cursor is moved to another item, the RGB values are subtracted again from the values ("0xFF", "0xFF", "0xFF"), whereby the RGB values are returned to the original values ("0x64", "0x80", "0x72"). The presence of the menu cursor can be expressed according to such a method.

In addition, such processing methods are all explained merely as examples. As another method, by loading and redrawing the original image data when the menu cursor is moved, the menu image can be restored. The presence of the menu cursor can be expressed according to any other methods.

Meanwhile, when the small menu is displayed, the display of the menu item is changed so that the menu item on which the menu cursor is present can be displayed within the area of the small menu. Even if the display area of the small menu is small, by reducing each menu item size, a plurality of menu items can be sometimes displayed in the small menu. In such a case, as the menu cursor moves, a menu item that has not been displayed in the small menu is displayed, and the display content of the small menu area can be scrolled. Moreover, in this case, as for the menu cursor in the large menu, the menu item on which the menu cursor is present can be highlighted or the like, so that the user can see that the menu cursor is present on that menu item.

After the processing in step ST134 or step ST135, the menu cursor movement event handler is terminated, and step ST117 of the event handling recurs.

Meanwhile, in step ST132, if it has been decided that the event is not an event generated as a result of the operation of the key 34, step ST136 ensues. Next, in step ST136, if it has been decided that the event is an event generated as a result of the operation of the key 36, step ST137 ensues.

In step ST137, whether the current menu cursor position is the lowermost menu item of the section/subsection is checked, and if it is the lowermost menu item, then step ST138 ensues. In step ST138, because no menu item is present below the current menu item, the menu cursor moves to the uppermost menu item of the section/subsection.

Meanwhile, in step ST137, if the current menu cursor position is not the lowermost menu item of the section/subsection, step ST139 ensues. Then in step ST139, the menu cursor moves to the next menu item down.

After the processing in step ST134 or step ST135, the menu cursor movement event handler is terminated, and step ST117 of the event handling recurs.

Meanwhile, in step ST136, if it has been decided that the event is not an event generated as a result of the operation of the key 36, step ST140 ensues. Next, in step ST140, if it has been decided that the event is an event generated as a result of the operation of the key 35, step ST141 ensues.

In step ST141, whether the current menu cursor position is in the leftmost section (the first section in the template) is checked, and if the menu cursor is on the menu item in the leftmost section, then step ST142 ensues. In step ST142, because the menu cursor cannot be moved further to a left adjacent menu item (a menu item in the previous section in the menu template), the menu cursor is moved to a menu item in the rightmost section (the last section in the menu template).

Meanwhile, in step ST141, if the current menu cursor position is not in the leftmost section, step ST143 ensues. In step ST143, the controller 14 moves the menu cursor to the left adjacent menu item.

After the processing in step ST142 or step ST143, the menu cursor movement event handler is terminated, and step ST117 of the event handling recurs.

Meanwhile, in step ST140, if it has been decided that the event is not an event generated as a result of the operation of the key 35, step ST144 ensues. Next, in step ST144, if it has been decided that the event is an event generated as a result of the operation of the key 37, step ST145 ensues.

In step ST145, whether the current menu cursor position is in the rightmost section (the last section in the template) is checked, and if the menu cursor is on the menu item in the rightmost section, then step ST146 ensues. In step ST146, because the menu cursor cannot be moved further to a right adjacent menu item (a menu item in the following section in the menu template), the menu cursor is moved to a menu item in the leftmost section (the first section in the menu template).

Meanwhile, in step ST145, if the current menu cursor position is not the leftmost section, step ST147 ensues. In step ST147, the controller 14 moves the menu cursor to the right adjacent menu item.

After the processing in step ST146 or step ST147, the menu cursor movement event handler is terminated, and step ST117 of the event handling recurs.

Above description is the explanation of the event handler for the menu cursor movement processing. Described as above, in the menu cursor movement, when the user tries to move the menu cursor further upward even though the menu cursor is on the uppermost menu item, for example, the menu cursor is moved to the lowermost menu item. Accordingly, all the menu items can be circularly selected. In order to move the menu cursor from the lowermost menu to the uppermost menu, operations such as continuing to press a key for a long time are not required, so that the operability is enhanced.

Figure 13:
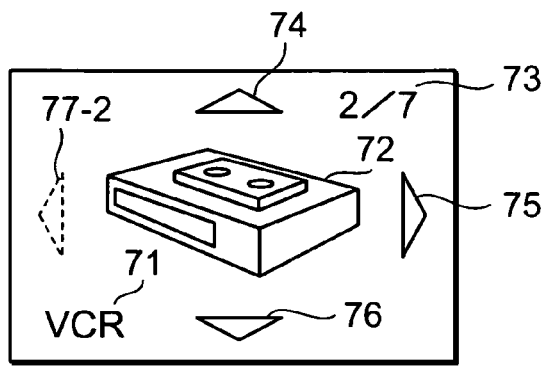
FIG. 13 is another front view of the small menu displayed by the television receiving system according to Embodiment 1 of the present invention.

However, such processing is not mandatory. For example, when the user tries to move the menu cursor further upward even though the menu cursor is on the uppermost menu item, a predetermined warning sound such as a beep sound can be generated to let the user know that the cursor cannot be moved any further. When the small menu is in display, and only a single menu item, for example, can be displayed because the area of the small menu is small, in order to indicate that the menu cursor is on the uppermost menu item and cannot be moved upward any further, such control can be performed, in which the upward arrow 74 in FIG. 11 is displayed in light color, or the upward arrow 74 is not displayed. FIG. 13 is a display example of the small menu, illustrating that the menu cursor cannot be moved leftward. In the figure, an arrow 77-2 is displayed in lighter color than the other arrows 74 through 76. By displaying as above, even though the displaying of the small menu is performed within the small area, the user can easily understand the entire menu structure. Accordingly, a useless operation, such as trying to move the menu cursor even though the menu cursor cannot be moved, will not be performed, so that the operability is enhanced as a whole.

(Switching of Menu Display)

Next, the operation when the user operates the button 40, or more specifically the menu switching button, of the instruction signal transmitter 4 will be described. When the user operates the button 40, in the same way as for the other button operations, a type of an event is finally stored in the queue. Next, in the event handling, because the value of the event counter 44 is not zero (step ST113), the event caused by the user's operation on the button 39 is taken out of the queue (step ST114), and an event handler corresponding to the event is retrieved from the interrupt vector (step ST115), so that the event handler for the menu display switching processing by operating the buttons 34 through 37 is executed.

Figure 14:
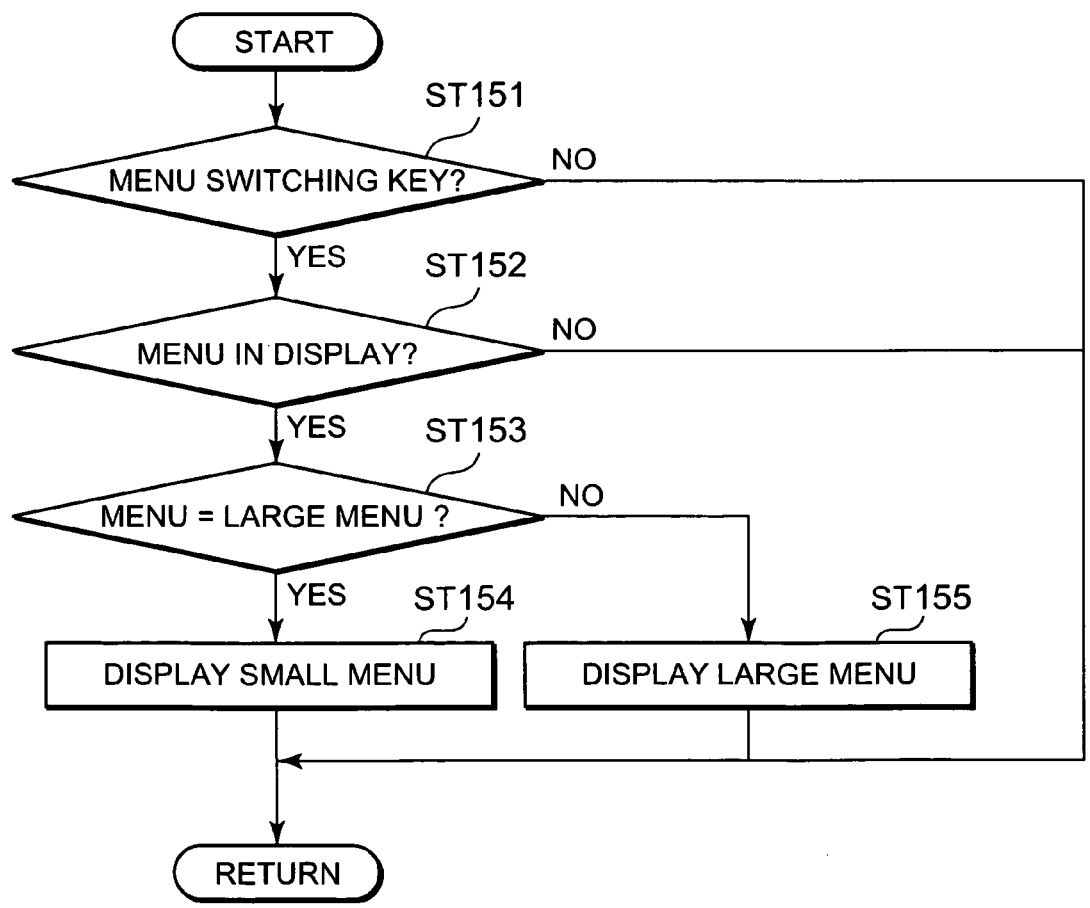
FIG. 14 is a flowchart for menu switching processing according to Embodiment 1 of the invention.

FIG. 14 is a flowchart of the event handler for switching the menu display. In step ST151 in the figure, the controller 14 checks whether the menu switching key has been operated. If it is decided that the menu switching key has been operated, step ST152 ensues. Otherwise, the event handler for switching the menu display is terminated, and step ST117 recurs.

In step ST152, the controller 14 checks whether the menu is currently displayed. If it is decided that the menu is in display, step ST153 ensues. Otherwise, the event handler for switching the menu display is terminated, and step ST117 recurs.

Next, in step ST153, the controller 14 checks whether the currently displayed menu is the large menu. If the menu is the large menu, step ST154 ensues; and otherwise, step ST155 ensues.

In step ST154, the currently displayed large menu is erased, but the small menu is displayed instead. Meanwhile in step ST155, the currently displayed small menu is erased, and instead, the large menu is displayed. The display processing for the large menu or the small menu, and the menu erasing processing have been mentioned in detail in the explanation of "Menu display/nondisplay processing", the explanation will be omitted here. In addition, the information on whether the current menu is a large menu or a small menu is stored in the ROM 17, and is used when the menu is redisplayed.

At the end, the event handler for switching the menu display is terminated, and step ST117 recurs.

(Timer Event Handling)

Next, the event handler for timer events will be described. Generally, a crystal oscillator constituting a timer can generate pulses every several microseconds. However, if all the pulses are taken to be converted into interrupt signals, processing load of the controller 14 increases for performing only the timer interrupt handling. Therefore, a filter is generally used to adjust the signals so as to generate interrupts at several millisecond to several second intervals. The filter is most simply realized so that the number of pulse occurrences is counted by configuring a counter with an electrical circuit, and when the number reaches a predetermined value, only a single interrupt signal is generated. However, other methods can be adopted.

Moreover, because a timer is usually used for a variety of purposes, events with various intervals may be stored in the queue. However, as a method of processing timer events related to menus, the processing for periodically changing menu display position will be described here.

When the large menu is in display, most of the screen is occupied by the large menu, so that there is little room for periodically updating the menu display position. In the meanwhile, when the small menu is in display, an occupied area by the small menu is small, so that the display position may be periodically updated.

Even though the occupied area by the small menu is small, underlying images might include an image that displays important information at the display position of the small menu. For example, viewers of a morning news program often watch the program while caring the current time displayed on the screen. In such a case, even though the area occupied by the small menu is small, if the small menu is displayed in the important display position of the current time, the time cannot be checked. Score display and the like in live sport telecast are the same.

However, if the display position of the small menu is periodically changed, even though the small menu is displayed temporarily in the position where the important information in the underlying image is displayed, the small menu is not always displayed in the position, so that functions of the small menu and the information presented by the underlying image can be utilized at the same time.

After the timer 16 transmits an interrupt signal to the controller 14, a timer event is stored in the queue as an event in the same manner as the event due to the button operation, and the event counter 44 is updated. Next, in the event handling, because the value of the event counter 44 is not zero (step ST113), the timer event is taken out of the queue (step ST114), and an event handler corresponding to the event is retrieved from the interrupt vector (step ST115), so that the event handler for timer events is executed.

Figure 15:
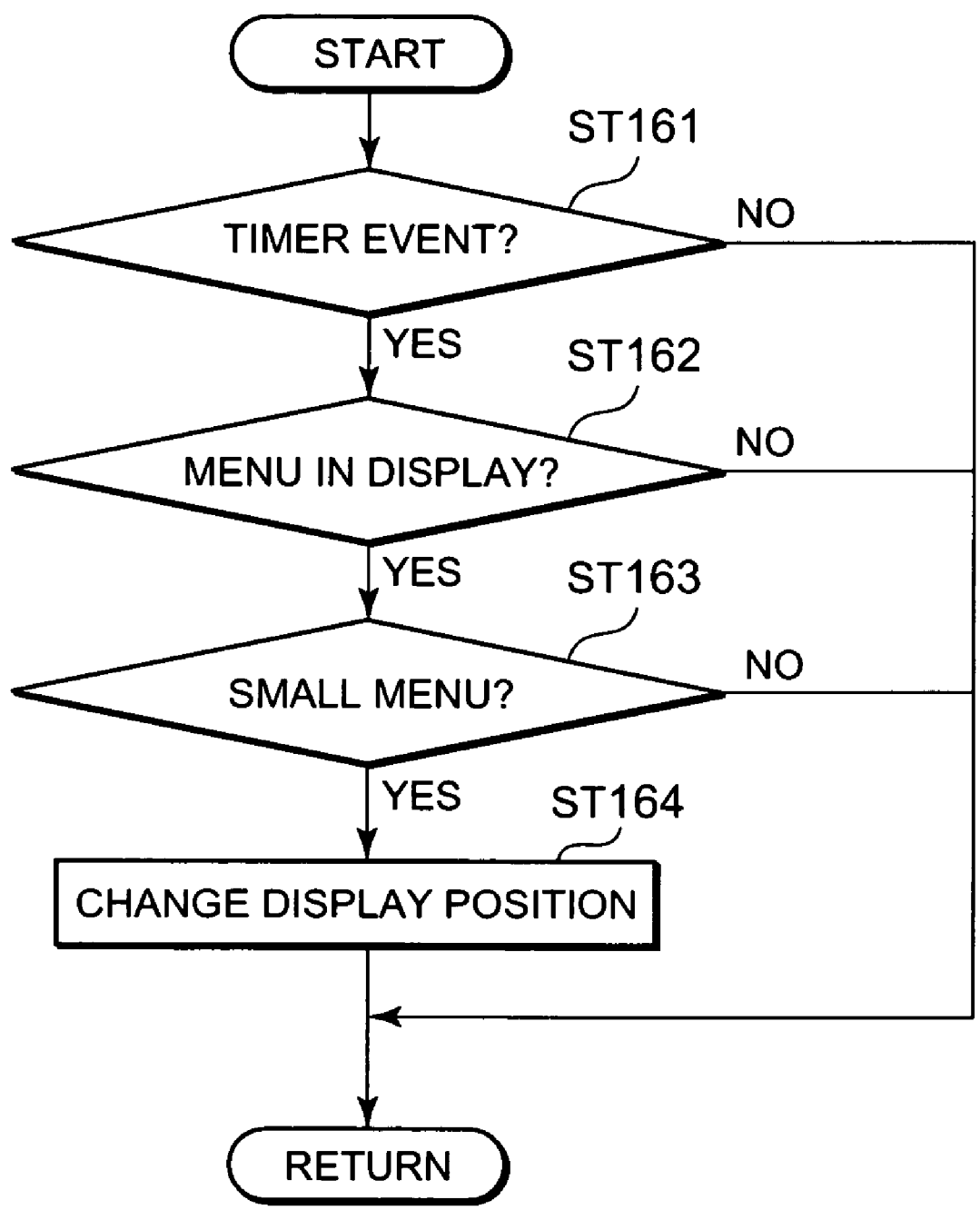
FIG. 15 is a flowchart for menu display position changing processing according to Embodiment 1 of the invention.

FIG. 15 is a flowchart of the event handler for the timer event handling. In step ST161 in the figure, the controller 14 checks whether the event is a timer event. If it is a timer event, step ST162 ensues. Otherwise, the event handler for timer events is terminated, and step ST117 recurs.

Next, in step ST162, the controller 14 checks whether the menu is in display. If the menu is in display, step ST163 ensues. Otherwise, the event handler for timer events is terminated, and step ST117 recurs.

In step ST163, the controller 14 checks whether the currently displayed menu is a small menu. If the small menu is in display, step ST164 ensues. Otherwise, the event handler for timer events is terminated, and step ST117 recurs.

In step ST164, the controller 14 generates random numbers, and a new display position of the small menu is determined. Then the current small menu is erased, and the small menu is displayed in the new display position. At the end, the event handler for timer events is terminated, and step ST117 recurs.

Obviously from the above description, the television receiving system in Embodiment 1 of the present invention is configured so that the menu can be switched between the large menu and the small menu, whereby a user unaccustomed to menu operations can understand with the large menu the entire options of functions, and a user accustomed to menu operations can perform the menu operation with the small menu while checking the status of the underlying image. In short, regardless of the operation proficiency of the user, a lot of functions that the television system provides can be easily utilized.

In addition, in a case in which the display position of the small menu is periodically changed based on timer events, when the display position is determined by generating random numbers, the display position of the small menu can be determined excluding an area close to the middle of the screen image. Information that viewers pay attention to is often displayed in the central portion of the screen image. By controlling the system so that the small menu is not displayed in the central portion of the screen image, the menu operability can be enhanced while a viewer can see the content of a TV program.

Moreover, although in the example, the system is configured so that infrared signals or wireless signals are transmitted between the instruction signal transmitter 4 and the instruction signal receiver 15, the system may be configured so that the both are connected via a signal cable, and that electrical signals are directly transmitted.

Furthermore, it is not necessary for the instruction signal transmitter 4 and the instruction signal receiver 15 to be located in physically separated positions. For example, the system may be configured so that the image display control device 3 and the display unit 5 are integrated together, and that operational buttons equivalent to the instruction signal transmitter 4 are provided on the chassis.

Moreover, although in the example, the configurations and operations of the present invention have been described taking a TV broadcasting receiving apparatus as an example of the television receiving system, the scope of application of the present invention is not limited to television receiving systems, but the invention can be widely applied to devices or systems that display images.

Furthermore, the images does not need to be moving pictures, but can be still images such as map images displayed in a car navigation system.

Embodiment 2

In Embodiment 1, an example has been described, in which random numbers are generated based on the timer events, and the display position of the small menu is changed. In addition to that, the system can be configured so that the display position of the small menu is determined based on the displayed content of the underlying image. A television receiving system according to Embodiment 2 of the present invention has such a feature.

Figure 16:
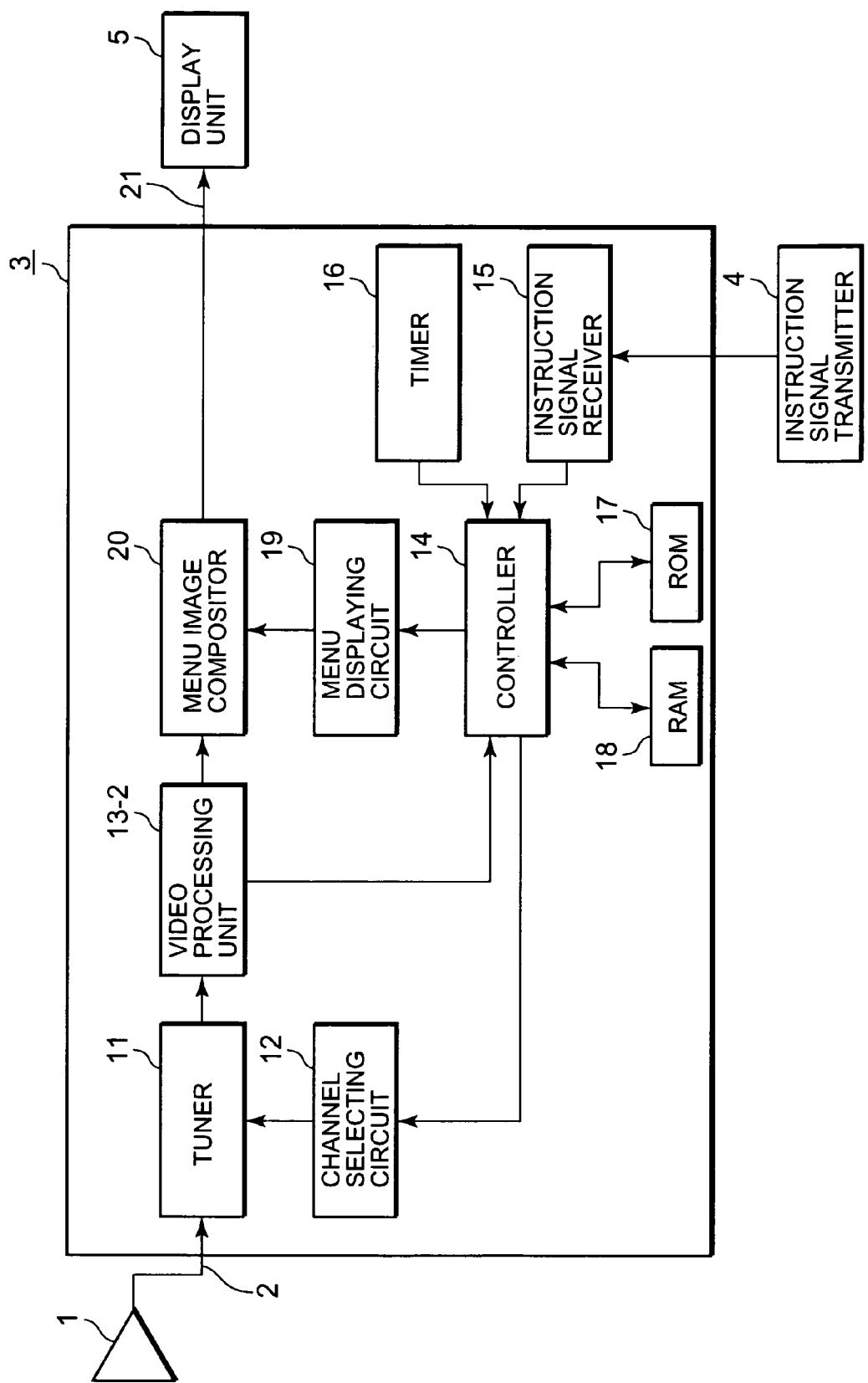
FIG. 16 is a block diagram illustrating the configuration of a television receiving system according to Embodiment 2 of the present invention.

FIG. 16 is a block diagram illustrating the configuration of the television receiving system according to Embodiment 2 of the present invention. In the figure, a video processing unit 13-2 is a component corresponding to the video processing unit 13 in FIG. 2, and is configured so that, in addition to processing for separating from channel signals into image signals and audio signals, image processing is performed to calculate light/shadow distribution in pixels for each frame and difference signals between frames, and, if a predetermined condition is satisfied, then an interrupt signal is generated. Because other components having the same numerals as in FIG. 2 are similar to those in Embodiment 1, the description therefor will be omitted.

Next, the operation of the television receiving system will be described. The television receiving system receives, as the television receiving system according to Embodiment 1, television broadcasting signals received by the receiving antenna 1, and outputs the image signals to the display unit 5 via the tuner 11, the video processing unit 13, and the menu image compositor 20. And, according to the signal from the instruction signal transmitter 4 operated by the user, the menu is displayed on the display unit 5, so that various operations can be performed.

The video processing unit 13 performs the processing for separating from channel signals into image signals and audio signals. In addition, in order to determine an appropriate area for displaying the small menu, the video processing unit 13 converts the separated analog image signals into digital signals, performs image processing on the digital signals, which is, for example, once developed in the display memory, and extracts pixel distributions within a frame and variations between frames, to output interrupt signals to the controller 14. For that purpose, the video processing unit 13 divides the entire image into small areas with the same size, and calculates pixel distributions and variations between adjacent frames for each of the small areas.

Figure 17:
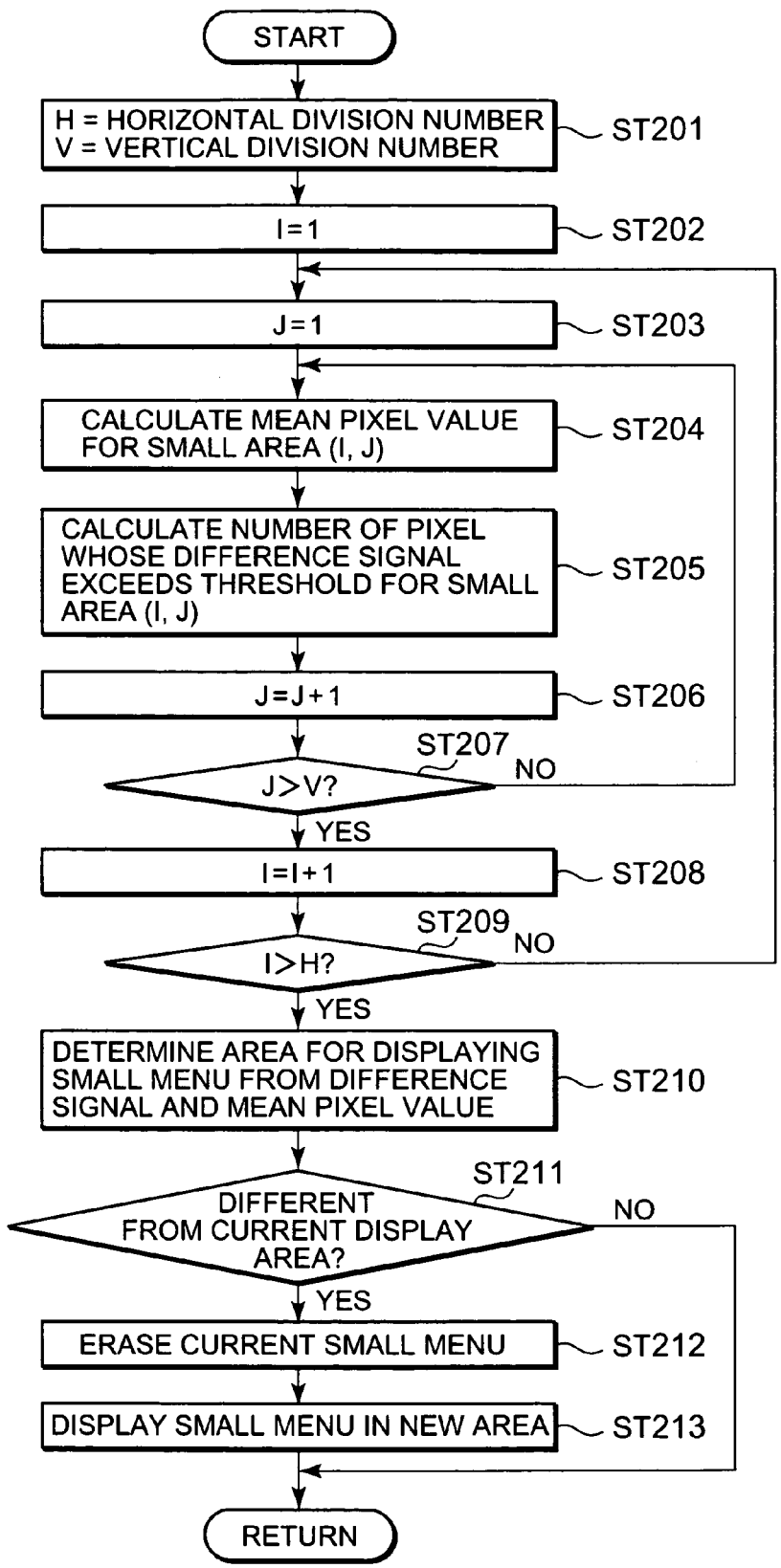
FIG. 17 is a flowchart for menu display position changing processing according to Embodiment 2 of the invention.

FIG. 17 is a flowchart of the image processing performed by the controller 13. In step ST201 in the figure, the video processing unit 13 initializes a variable H to be the horizontal number of the small areas, and a variable V to be the vertical number of the small areas. Next, the video processing unit 13 initializes a counter variable "I" to be "1" in step ST202, and initializes a counter variable "J" to be "1" in step ST203. The counter variable "I" is a counter variable for sequentially processing each small area in a horizontal direction, and the counter variable "J" is a counter variable for sequentially processing each small area in a vertical direction. In addition, in the following explanations, a certain small area is expressed as a small area (I, J).

Next, in step ST204, the video processing unit 13 divides by the number of pixels the total sum of the pixel values for the pixels in a small area (I, J) to calculate the mean pixel value for the small area (I, J). Given that the pixel values for the television receiving system are expressed in 256 tones, when the pixel value is "255", the luminance thereof is highest, and the pixel value is "0", the luminance is lowest. In the RGB expression, because pixel values are present independently for each plane—R (red), G (green), and B (blue), the mean pixel value can be independently calculated for each plane, or the mean pixel values for each plane can be further averaged out.

Moreover, instead of evenly weighting all the pixel values in the small areas, the mean value can be calculated only from the pixels having a pixel value of a predetermined value or larger. For example, when the current time is displayed, the characters expressing the time are in high luminance, and have large pixel values. Therefore, by selecting only pixels having a pixel value of a predetermined value or larger, and calculating the mean value from the pixel values of the selected pixels, the small areas in which the characters are displayed and the rest of small areas can be discriminated.

Next, in step ST205, the video processing unit 13 calculates difference signals between the previous frame and the current frame for the small area (I, J). The difference signal is a variation in value between frames for a certain pixel. In the small area in which a lot of pixels having a large difference signal are distributed, it can be said that the movement as a moving image is large. Here, the difference signal for each pixel is calculated, and the number of pixels whose absolute value of the difference signal exceeds a threshold is calculated. In addition, also in this case, a method can be adopted, in which the difference signal is independently calculated for each plane of RGB, and when a variation of a predetermined value or larger is present in any of the planes, those pixels are counted. Moreover, the pixels can be counted based on variation in the total sum of RGB values.

Next, the video processing unit 13 increments the counter variable "J" by "1" in step ST206, and whether "J" has exceeded "V" is judged in step ST207. If "J" has not exceeded "V", small areas to be processed are left in a vertical direction, so that step ST204 recurs to perform processing for the next small area. Meanwhile, if "J" has exceeded "V", step ST208 ensues.

In step ST208, the counter variable "I" is incremented by "1". Then, in step ST209, whether the counter variable "I" has exceeded "H" is judged. If "I" has not exceeded "H", small areas to be processed are left in a horizontal direction, so that step ST203 ensues to perform processing for the horizontally next small area. Meanwhile, if "I" has exceeded "H", step ST210 ensues.

Next, in step ST210, from the difference signal distribution for each small area and from the mean pixel value, an appropriate area for displaying the small menu is determined. For this purpose, the following criteria, for example, are established, to check whether each small area satisfies the criteria.

(a) The mean pixel value is not larger than a predetermined value, or is smaller than a predetermined value.

(b) The distribution frequency of the difference signals that are not smaller than the threshold is not larger than a predetermined value, or is smaller than a predetermined value.

Then, candidates for the small menu display area are narrowed down according to the following criteria (1) and (2).

(1) If there is a small area that satisfies both (a) and (b), the small area is determined to be a candidate for the small menu display area.

(2) If there is no small area that satisfies both (a) and (b), a small area that satisfies either (a) or (b) is determined to be a candidate for the small menu display area.

In addition, in the example, the priority of the criterion (2) is less than that of the criterion (1) (only when there is no small area that meets the criterion (1), the criterion (2) applies). However, this is not mandatory, so that a candidate for the small area can be selected only by the criterion (2). Moreover, if no small area that, meets the criteria is obtained as a result of the selection according to the criteria (1) and (2), the predetermined values in (a) and (b) can be varied step by step to select candidates for the small area.

Furthermore, if a plurality of such candidates for the small menu display area are present, the display area that is closest to the current small menu display area can be selected. The reason is that, when the small menu is in display, if the display position is largely varied, the user's eyes become unable to follow the small menu position. In order to avoid such a situation, it is preferable to move the small menu to the position as close as possible. However, this is not mandatory.

Establishing the criterion (a) makes it less likely that the small menu is displayed in the small area that includes a lot of bright pixels. Regarding the screen image, information that a viewer pays attention to, such as the face of a performer in a TV program, is often displayed brighter than the other areas. The criterion (a) makes it possible that the small menu is displayed and operated without interfering with the image that the viewer desires to see.

In addition, establishing the criterion (b) makes it less likely that the small menu is displayed in the small area in which pixel values largely varies. More specifically, it is made less likely that the small menu hides moving portions within the screen image. Because viewers tend to pay attention to moving portions within the video image, this makes it possible to enhance the operability of the small menu while letting the viewers check the video content.

Moreover, although the example in which the difference signal is calculated only between the previous frame and the current frame has been described here, any determination method can be used as long as the display position of the small menu is determined based on temporal variations in the underlying image. For example, the determination can be made so that a small area in which variations are statistically small is selected based on pixel value variations in larger number of frames.

Embodiment 3

In Embodiment 1 and Embodiment 2, the small menu has been described as a menu that occupies a small area in the screen image. However, the system can be configured so that, within the large menu area, the menu item on which the menu cursor is present is preserved as a small menu, and the rest of the area is halftoned, whereby the underlying image in the area excluding the menu item on which the menu cursor is present is practically recognizable.

Moreover, instead of preserving only the menu item on which the menu cursor is present, the section or the subsection that includes the menu item on which the menu cursor is present can be preserved.

Figure 18:
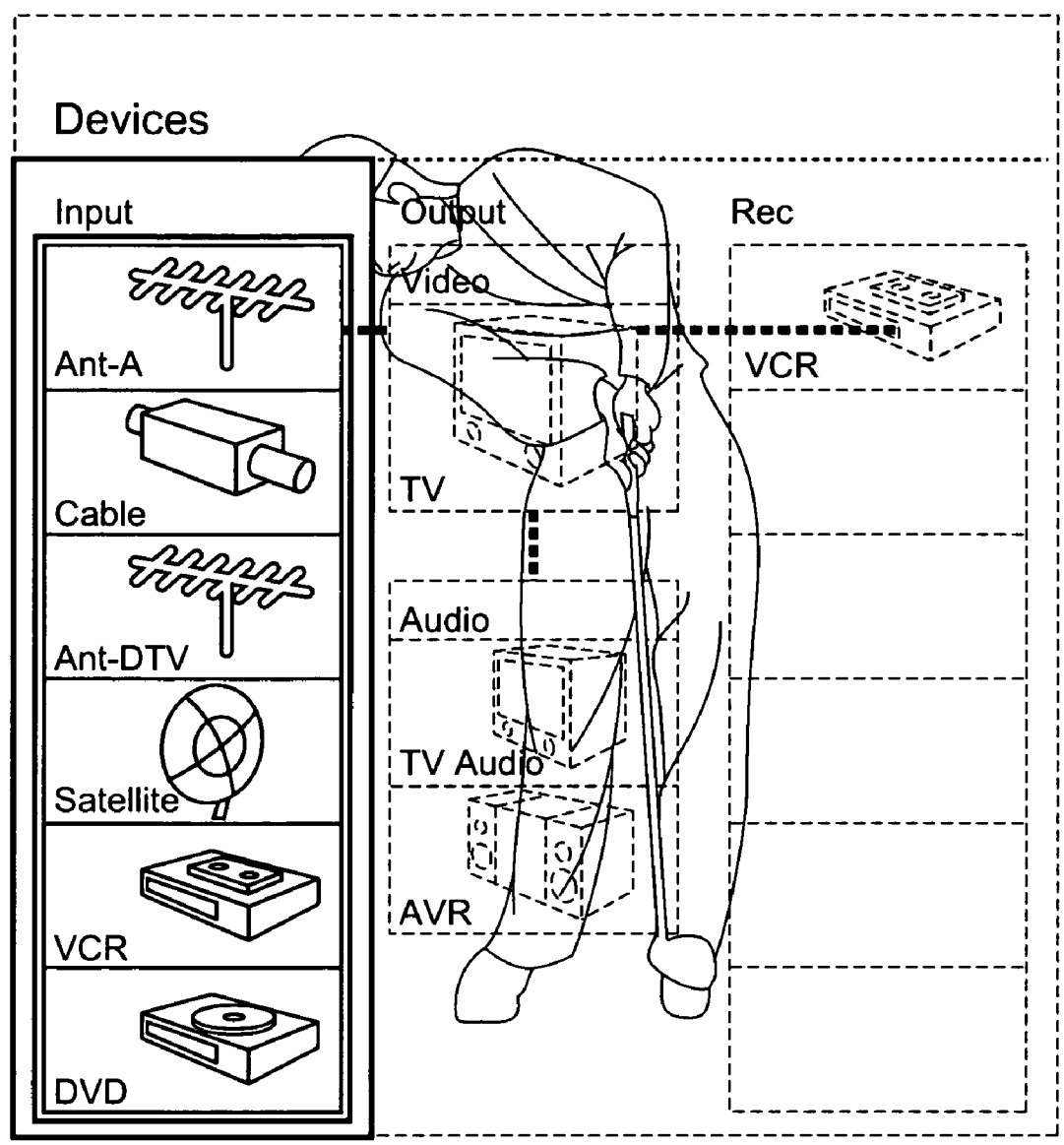
FIG. 18 is a view illustrating an example of a menu displaying method according to Embodiment 3 of the invention.

FIG. 18 is a diagram illustrating an example of a state in which, when the menu cursor is on the section "Input" in the large menu illustrated in FIG. 10, the rest of the area is halftoned, to make the displayed content of the underlying image recognizable. As seen from the figure, by halftoning the area other than the section "Input", a significant portion of the underlying image can be recognized. In such a case, the area of the section "Input" corresponds to the small menu area.

Figure 19:
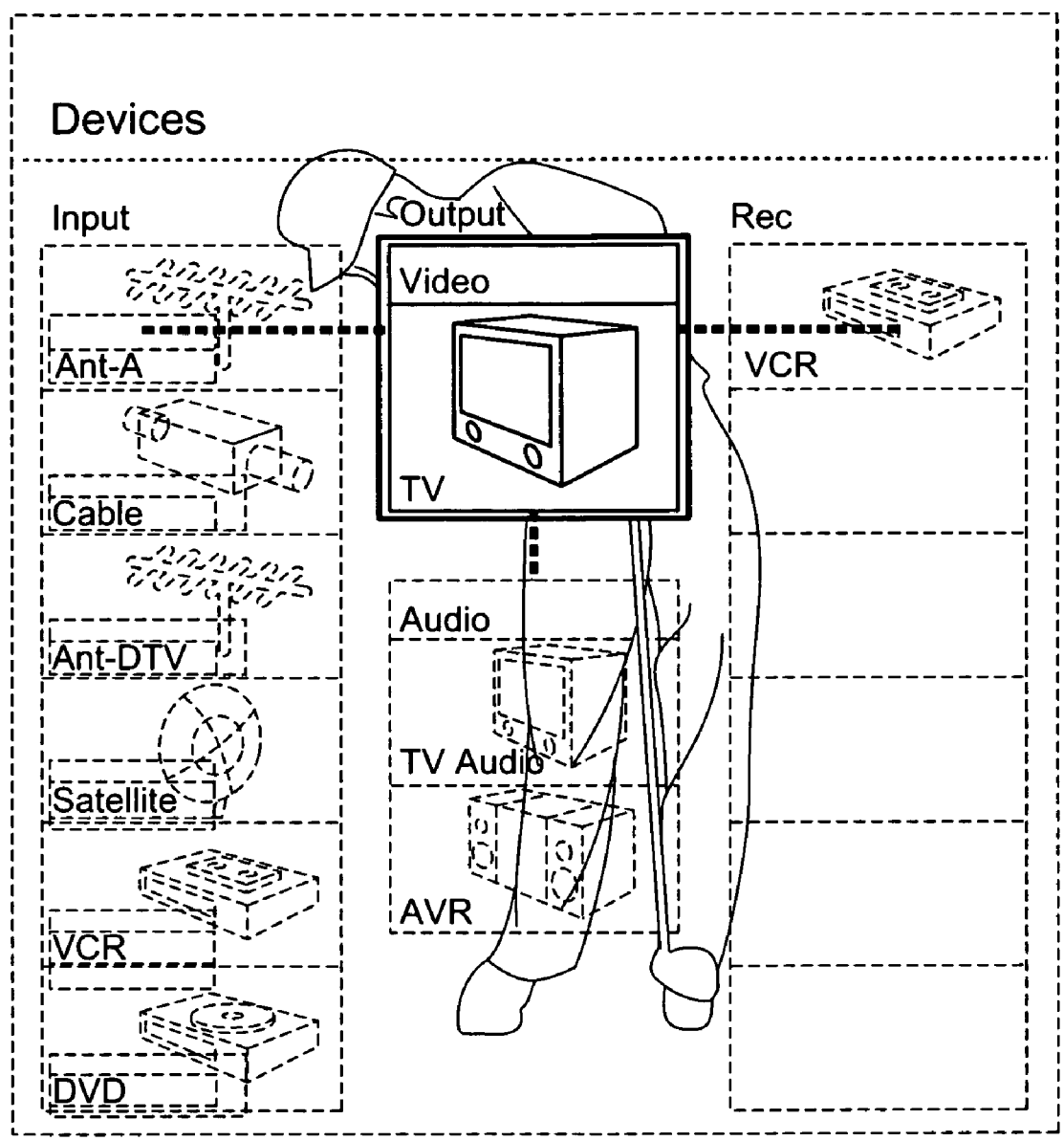
FIG. 19 is a view illustrating another example of the menu displaying method according to Embodiment 3 of the invention.
Figure 20:
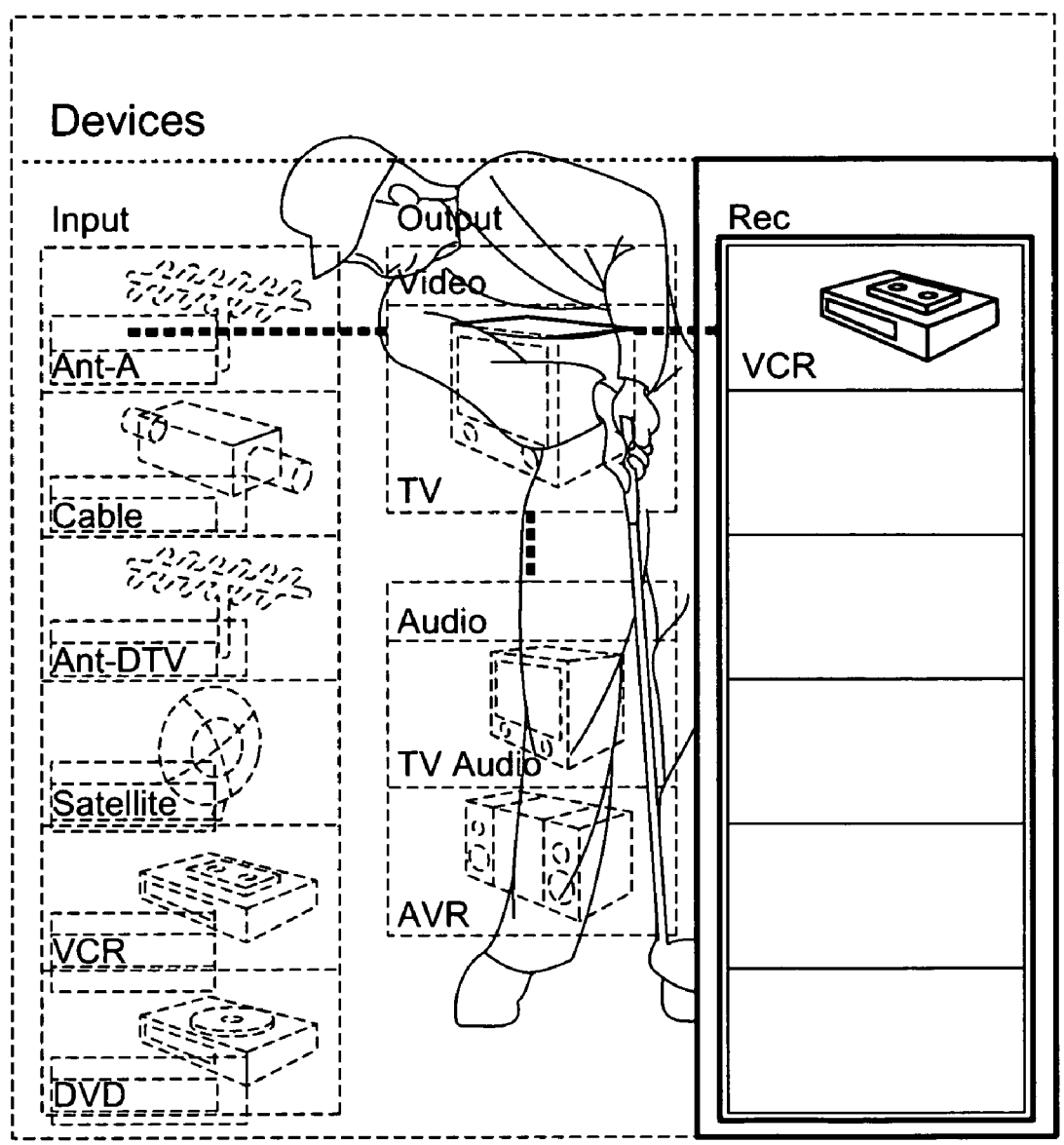
FIG. 20 is a view illustrating another example of the menu displaying method according to Embodiment 3 of the invention.

Furthermore, FIG. 19 is a diagram illustrating an example of a state in which the menu cursor on the "Input" section in FIG. 18 has been moved to the next menu item right in the subsection "Output". In this case, the section "Input" is halftoned, but the menu item in the subsection "Output" is clearly displayed instead. Moreover, FIG. 20 is a diagram illustrating an example of a state in which the menu cursor has been moved further to the next menu item right.

In addition, in order to halftone a portion of the large menu display, in the menu image compositor 20 in the image display control device 3 in Embodiment 1, one out of every several pixels in the area other than the selected menu item/section/subsection is thinned out, and the pixel value of each pixel that has been thinned out is replaced with the pixel value of the pixel in the same position, outputted from the image processing unit 13.

Moreover, in the menu image outputted from the menu displaying circuit 19, each pixel value in the area other than the selected menu item, section, or subsection is reduced to half, for example, and, to the reduced pixel value, the pixel value of the video image from the image processing unit 13 can be added, or other publicly-known halftoning methods can be used.

INDUSTRIAL APPLICABILITY

As described above, the image display control device relevant to the present invention is useful in enhancing operability of devices such as a video display device.

What is claimed is:

1. An image display control device for displaying on a display unit a large menu having a plurality of menu items, and an underlying image obtained from a broadcasting signal, to allow performing menu item selection and operation according to instructions by a user, the image display device comprising:

a controller that selects and controls, according to instructions received from the user, either the large menu or a small menu having only a portion of the plurality of menu items in the large menu; and a menu image compositor that displays on the display unit, according to control by the controller, the large menu or the small menu together with the underlying image, wherein whether or not the large menu or the small menu is displayed is based a menu switching signal received from the user, wherein the controller controls the menu image compositor so as to change the position of the area in which the small menu is displayed based on the displayed content of the underlying image.

2. An image display control device according to claim 1, wherein the controller controls the menu image compositor so as to display on the small menu different menu items in the large menu according to the instructions.

3. An image display control device according to claim 1, wherein the plurality of menu items in the large menu has predetermined display order, and
the controller controls the menu image compositor so as to indicate, when one of the plurality of menu items of the large menu not displayed in the small menu is adjacent to a menu item displayed in the small menu, the direction in which the adjacent menu item is present.

4. An image display control device according to claim 1, wherein the controller controls the menu image compositor so as to display information regarding in what position a menu item display in the small menu is displayed in the large menu.

5. An image display control device according to claim 1, wherein the controller controls the menu image compositor so as to change the display position of the small menu area to an area excluding the central portion of the underlying image.

6. An image display control device according to claim 1, wherein the controller controls the menu image compositor so as to change the display position of the small menu area according to light/shadow distribution in the underlying image.

7. An image display control device according to claim 6, wherein the controller controls the menu image compositor so as to change the display position of the small menu area according to temporal variation in the light/shadow distribution in the underlying image.

8. An image display control device according to claim 1, wherein, when the small menu is displayed, the menu image compositor halftones an area in which the area including the menu items included in the small menu is excluded from the large menu display area, and in the halftoned area transparently displays, on the display unit, the underlying image.

9. An image display system comprising:
a display unit; and
an image display control device for displaying on the display unit a large menu having a plurality of menu items, and an underlying image obtained from a broadcasting signal, to allow performing menu item selection and operation according to instructions by a user;
wherein the image display control device comprises:
a controller that selects and controls, according to instructions received from the user, display of the large menu and a small menu having only a portion of the plurality of menu items in the large menu; and
a menu image compositor that displays on the display unit, according to control by the controller, the large menu or the small menu together with the underlying image, wherein
whether or not the large menu or the small menu is displayed is based a menu switching signal received from the user; and
wherein the controller controls the menu image compositor so as to change the position of the area in which the small menu is displayed based on the content of the underlying image.

* * * * *